US 8,437,971 B2
May 7, 2013

(54) ORIENTATION CALCULATION APPARATUS, STORAGE MEDIUM HAVING ORIENTATION CALCULATION PROGRAM STORED THEREIN, GAME APPARATUS, AND STORAGE MEDIUM HAVING GAME PROGRAM STORED THEREIN

(75) Inventors: Ichiro Suzuki, Kyoto (JP); Keizo Ohta, Kyoto (JP)

(73) Assignee: Nintendo Co. Ltd., Koyoto (JP)

( * ) Notice: Subject to any disclaimer, the term of this patent is extended or adjusted under 35 U.S.C. 154(b) by 791 days.

(21) Appl. No.: 12/473,001

(22) Filed: May 27, 2009

(65) Prior Publication Data

US 2009/0325703 A1 Dec. 31, 2009

(30) Foreign Application Priority Data

Jun. 30, 2008 (JP) ................. 2008-171518
Jun. 30, 2008 (JP) ................. 2008-171519
Mar. 9, 2009 (JP) ................. 2009-054955

(51) Int. Cl.
  *G01C 17/38* (2006.01)
(52) U.S. Cl.
  USPC ............. 702/94; 702/141; 702/150; 463/37
(58) Field of Classification Search .............. 463/37; 702/94, 141, 150
  See application file for complete search history.

(56) References Cited

U.S. PATENT DOCUMENTS

| 5,138,154 | A | 8/1992 | Hotelling |
| 5,181,181 | A | 1/1993 | Glynn |
| 5,440,326 | A | 8/1995 | Quinn |
| 5,698,784 | A | 12/1997 | Hotelling et al. |
| 5,825,350 | A | 10/1998 | Case, Jr. et al. |
| 5,898,421 | A | 4/1999 | Quinn |
| 7,405,725 | B2 | 7/2008 | Mohri et al. |
| 2002/0188416 | A1 | 12/2002 | Zhou et al. |
| 2003/0115930 | A1* | 6/2003 | Kappi et al. ............... 73/1.37 |
| 2004/0140962 | A1 | 7/2004 | Wang et al. |
| 2005/0162382 | A1 | 7/2005 | Choi et al. |
| 2005/0270494 | A1 | 12/2005 | Banning |
| 2006/0287085 | A1 | 12/2006 | Mao et al. |
| 2007/0002015 | A1 | 1/2007 | Mohri et al. |
| 2007/0176899 | A1 | 8/2007 | Yoo et al. |

(Continued)

FOREIGN PATENT DOCUMENTS

| EP | 1 762 287 | 3/2007 |
| EP | 1 839 714 | 10/2007 |

(Continued)

OTHER PUBLICATIONS

Oct. 22, 2012 Office Action in U.S. Appl. No. 12/712,362, 7 pages.

(Continued)

*Primary Examiner* — N Drew Richards
*Assistant Examiner* — John P Dulka
(74) *Attorney, Agent, or Firm* — Nixon & Vanderhye P.C.

(57) ABSTRACT

A game apparatus obtains data from an input device including at least a gyroscope and an acceleration sensor, and calculates an orientation of the input device. The game apparatus includes orientation calculation means and correction means. The orientation calculation means calculates a first orientation of the input device in accordance with an angular rate detected by the gyroscope. The correction means corrects the first orientation so as to approach a second orientation of the input device as the angular rate decreases, the second orientation being an orientation in which a direction of an acceleration represented by acceleration data detected by the acceleration sensor is a vertically downward direction.

25 Claims, 13 Drawing Sheets

U.S. PATENT DOCUMENTS

| | | |
|---|---|---|
| 2007/0257885 A1 | 11/2007 | Liberty |
| 2007/0259717 A1 | 11/2007 | Mattice et al. |
| 2008/0105050 A1 | 5/2008 | Kraetz |
| 2008/0125223 A1 | 5/2008 | Ohta |
| 2008/0174550 A1 | 7/2008 | Laurila et al. |
| 2008/0211768 A1 | 9/2008 | Breen et al. |
| 2008/0278445 A1 | 11/2008 | Sweetser et al. |

FOREIGN PATENT DOCUMENTS

| | | | |
|---|---|---|---|
| EP | 1839714 A2 | * | 10/2007 |
| EP | 1 927 383 | | 6/2008 |
| EP | 1 933 226 | | 6/2008 |
| JP | 11-085387 | | 3/1999 |
| JP | 2000-97637 | | 4/2000 |
| JP | 2000-308756 | | 11/2000 |
| JP | 2004-264892 | | 9/2004 |

OTHER PUBLICATIONS

Notice of Allowance issued for U.S. Appl. No. 12/472,628, dated Jan. 3, 2013.

* cited by examiner

ORIENTATION CALCULATION APPARATUS, STORAGE MEDIUM HAVING ORIENTATION CALCULATION PROGRAM STORED THEREIN, GAME APPARATUS, AND STORAGE MEDIUM HAVING GAME PROGRAM STORED THEREIN

CROSS REFERENCE TO RELATED APPLICATION

The present application claims the benefit of Japanese Patent Application Nos. 2009-54955, filed Mar. 9, 2009; 2008-171518, filed on Jun. 30, 2008; and 2008-171519 filed Jun. 30, 2008, the entire contents of each of which are incorporated herein by reference.

BACKGROUND OF THE INVENTION

1. Field of the Invention

The present invention relates to orientation calculation apparatuses or storage media having an orientation calculation program stored therein, and more particularly to an orientation calculation apparatus for calculating an orientation of an input device or a storage medium having stored therein an orientation calculation program for calculating an orientation of an input device.

2. Description of the Background Art

Until now, there have been devised techniques for calculating an orientation of an input device using an acceleration sensor and a gyroscope. For example, Patent Document 1 (Japanese Laid-Open Patent Publication No. 2000-308756) discloses a game apparatus using an input control device including an acceleration sensor and a gyroscope. This game apparatus controls a sword held by a game character in accordance with movement of the input control device. Specifically, data representing an action of wielding the sword is generated based on an output from the acceleration sensor, and data representing an orientation of the sword is generated based on an output from the gyroscope.

When the orientation is calculated using the gyroscope as described in Patent Document 1, some error may occur between the calculated orientation and an actual orientation of the input control device. For example, when the movement of the input control device is slow, the gyroscope may fail to detect an angular rate of the input control device, whereas when the movement of the input control device is vigorous, the angular rate of the input control device may be outside a range in which the gyroscope is allowed to detect the angular rate. Further, also when the angular rate abruptly changes in a period shorter than an interval between outputs of angular rate data, some error may occur. The error of the angular rate is cumulatively added to the orientation calculated based on the angular rate over the passage of time, and therefore the error of the orientation may be increased. In Patent Document 1, the error of the orientation calculated by the gyroscope is not considered, and therefore the orientation may not be accurately calculated.

SUMMARY OF THE INVENTION

Therefore, an object of the present invention is to provide an orientation calculation apparatus capable of accurately calculating an orientation of an input device using a gyroscope, or a storage medium having stored therein an orientation calculation program for accurately calculating an orientation of an input device using a gyroscope.

The present invention has the following features to attain the object mentioned above. Here, the reference numerals, the supplementary description and the like in the parentheses indicate a correspondence with the embodiment described below in order to aid in understanding the present invention and are not intended to limit, in any way, the scope of the present invention.

A first aspect of the present invention is directed to an orientation calculation apparatus (game apparatus 3) for obtaining data (operation data) from an input device (8) including at least a gyroscope (55, 56) and an acceleration sensor (37), and calculating an orientation of the input device. The orientation calculation apparatus includes orientation calculation means (CPU 10 performing step S4; hereinafter, only step numbers will be indicated), and first correction means (S5). The orientation calculation means calculates a first orientation (first orientation data 68) of the input device in accordance with an angular rate (angular rate data 63) detected by the gyroscope. The first correction means corrects the first orientation (angle $\theta 1$) so as to approach a second orientation (angle $\theta 2$) of the input device as the angular rate decreases, wherein the second orientation is an orientation in which a direction of an acceleration represented by acceleration data (64) detected by the acceleration sensor is a vertically downward direction (S17).

According to the above description, the first orientation calculated using the gyroscope is corrected based on the acceleration data. Therefore, any error in the orientation calculated by the gyroscope can be corrected, making it possible to accurately calculate the orientation of the input device using the gyroscope. Also, according to the above description, the lower the magnitude of the angular rate is, the more deeply the second orientation is reflected in the corrected orientation. Here, it is assumed that the lower the magnitude of the angular rate is, the more accurately the detection result from the acceleration sensor represents the direction of the gravitational acceleration, and therefore it is assumed that the second orientation is more accurately obtained. According to the above aspect, when the second orientation is not accurately obtained, the first orientation is not substantially corrected, whereas when the second orientation is accurately obtained, the first orientation is corrected so as to more closely approach the second orientation, thereby enabling the orientation to be corrected with enhanced accuracy.

A second aspect of the present invention is directed to an orientation calculation apparatus (game apparatus 3) for obtaining data (operation data) from an input device (8) including at least a gyroscope (55, 56) and an acceleration sensor (37), and calculating an orientation of the input device. The orientation calculation apparatus includes orientation calculation means (step S4) and first correction means (S5). The orientation calculation means calculates a first orientation (first orientation data 68) of the input device in accordance with an angular rate (angular rate data 63) detected by the gyroscope. The first correction means corrects the first orientation (angle $\theta 1$) so as to approach a second orientation (angle $\theta 2$) of the input device as an amount of change (jerk) per unit time for an acceleration decreases, wherein the second orientation is an orientation in which a direction of the acceleration is a vertically downward direction, and the acceleration is represented by acceleration data (64) detected by the acceleration sensor (S19).

According to the above description, the first orientation calculated using the gyroscope is corrected based on the acceleration data. Therefore, any error in the orientation calculated by the gyroscope can be corrected, making it possible to accurately calculate the orientation of the input device using the gyroscope. Also, according to the above description, the lower the amount of change per unit time for the acceleration is, the more deeply the second orientation is reflected in the corrected orientation. Here, it is assumed that the lower the amount of change is, the more accurately the detection result from the acceleration sensor represents the direction of the gravitational acceleration, and therefore it is assumed that the second orientation is more accurately obtained. According to the above aspect, when the second orientation is not accurately obtained, the first orientation is not substantially corrected, whereas when the second orientation is accurately obtained, the first orientation is corrected so as to more closely approach the second orientation, thereby enabling the orientation to be corrected with enhanced accuracy.

Also, the input device may further include image pickup means (image pickup element 40). In this case, the orientation calculation apparatus further includes second correction means (S6) for correcting the first orientation in accordance with an image (pickup image) of a predetermined subject taken by the image pickup means.

According to the above description, the first orientation calculated using the gyroscope is corrected based on the image of the subject. Therefore, any error in the orientation calculated by the gyroscope can be corrected, making it possible to accurately calculate the orientation of the input device using the gyroscope.

Further, the first correction means may further correct the first orientation such that the closer a magnitude of the acceleration is to a magnitude of a gravitational acceleration, the more closely the first orientation approaches the second orientation (S16).

According to the above description, the closer the magnitude of the acceleration detected by the acceleration sensor is to the magnitude of the gravitational acceleration, the more deeply the second orientation is reflected in the corrected orientation. It is assumed that the closer the magnitude of the acceleration is to the magnitude of the gravitational acceleration, the more accurately the detection result from the acceleration sensor represents the direction of the gravitational acceleration, and therefore it is assumed that the second orientation is more accurately obtained. According to the above aspect, when the second orientation is not accurately obtained, the first orientation is not substantially corrected, whereas when the second orientation is accurately obtained, the first orientation is corrected so as to more closely approach the second orientation, thereby enabling the orientation to be corrected with enhanced accuracy.

Further, the first correction means may correct the first orientation only when a difference between a magnitude of an acceleration represented by the acceleration data and a magnitude of a gravitational acceleration is smaller than a predetermined reference value (S15).

According to the above description, when the difference between the magnitude of the acceleration detected by the acceleration sensor and the magnitude of the gravitational acceleration is greater than or equal to the predetermined reference, the first correction means does not make the correction. That is, when it is assumed that the detection result from the acceleration sensor does not accurately represent the direction of the gravitational acceleration (the detection result represents an inaccurate direction), the correction using the second orientation is not made, resulting in the orientation being calculated with enhanced accuracy.

Also, in the first aspect, the first correction means may further correct the first orientation so as to approach the second orientation as an amount of change per unit time for the acceleration decreases.

According to the above description, as in the second aspect, it is possible to more accurately calculate the corrected orientation.

Further, the present invention may be provided as a game apparatus for performing a game process using, as the orientation of the input device, the first orientation corrected by the orientation calculation apparatus.

According to the above description, a player of the game can operate the game using, as a game input, an accurate first orientation corrected based on acceleration data and an image taken of a subject, which contributes to enhanced game operability in accordance with the orientation of the input device.

Further, the present invention may be embodied as a storage medium having stored therein an orientation calculation program or a game program for causing a computer of an information processing apparatus to function as the respective means described above.

According to the present invention, the orientation calculated using the gyroscope is corrected based on the acceleration data. Therefore, any error in the orientation calculated by the gyroscope can be corrected, making it possible to accurately calculate the orientation of the input device using the gyroscope.

These and other objects, features, aspects and advantages of the present invention will become more apparent from the following detailed description of the present invention when taken in conjunction with the accompanying drawings.

DESCRIPTION OF THE PREFERRED EMBODIMENTS

[Entire Structure of Game System]

Figure 1:
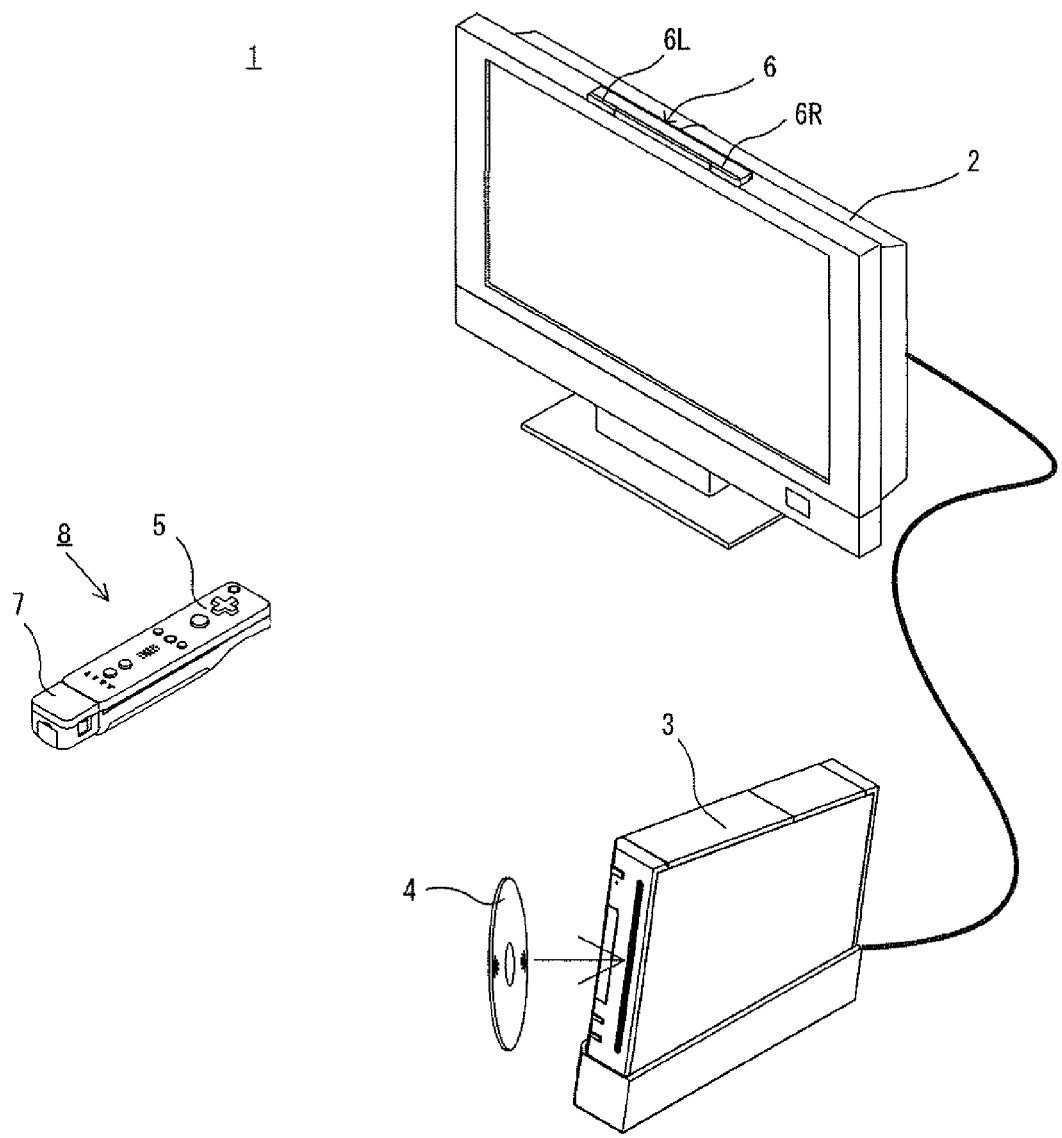
FIG. 1 is an external view of a game system.

With reference to FIG. 1, a game system 1 including a game apparatus typifying an orientation calculation apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 provides the game apparatus 3 with operation data representing the content of an operation performed on the input device 8 itself. In the present embodiment, the input device 8 includes a controller 5 and a gyroscope unit 7. As described in detail below, the input device 8 is structured such that the gyroscope unit 7 is detachably connected to the controller 5. Radio communication is made between the controller 5 and the game apparatus 3. In the present embodiment, the radio communication between the controller 5 and the game apparatus 3 is made using, for example, the Bluetooth (Registered Trademark) technology. In another embodiment, the connection between the controller 5 and the game apparatus 3 may be a wired connection.

[Internal Structure of Game Apparatus 3]

Figure 2:
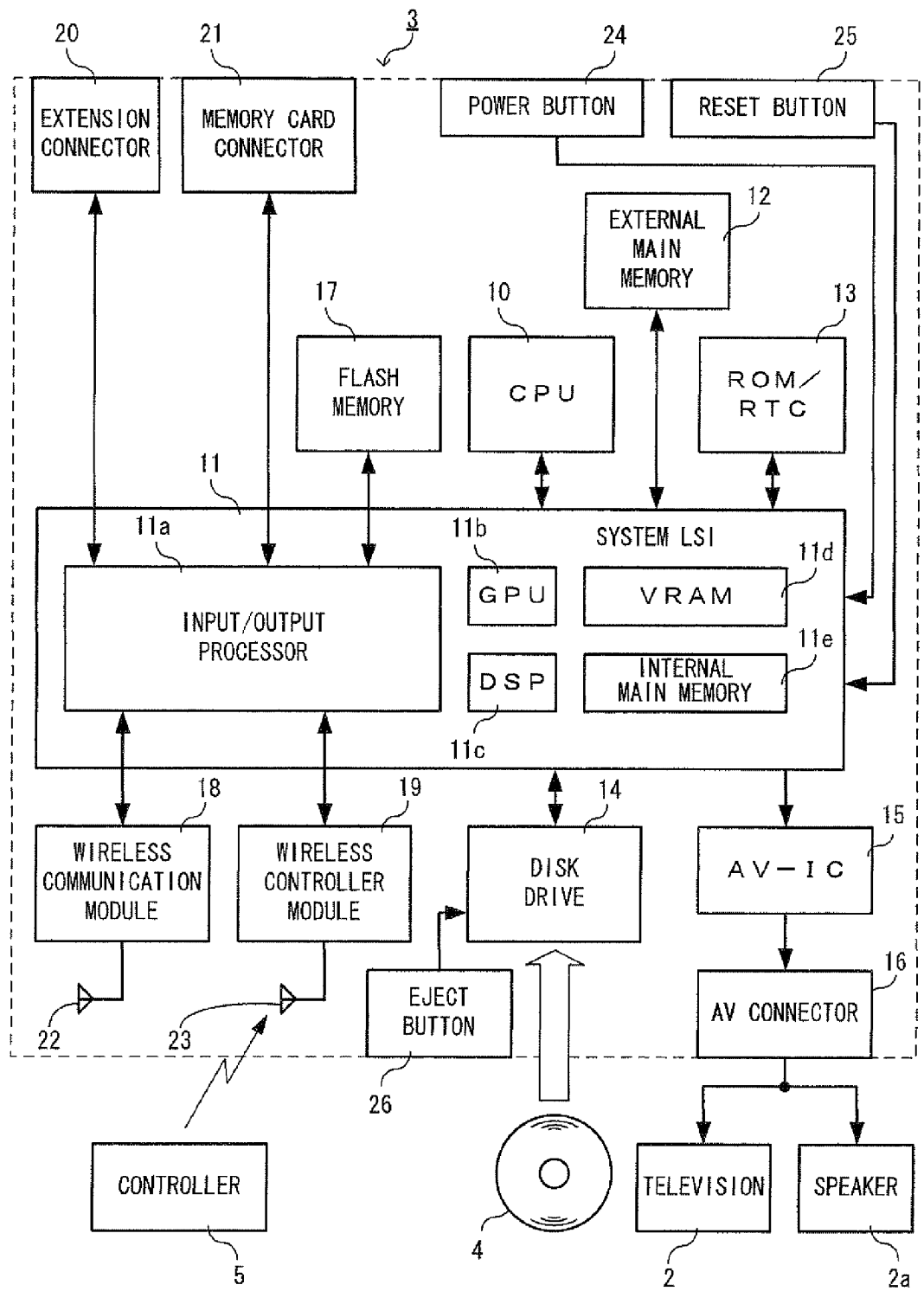
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the CPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
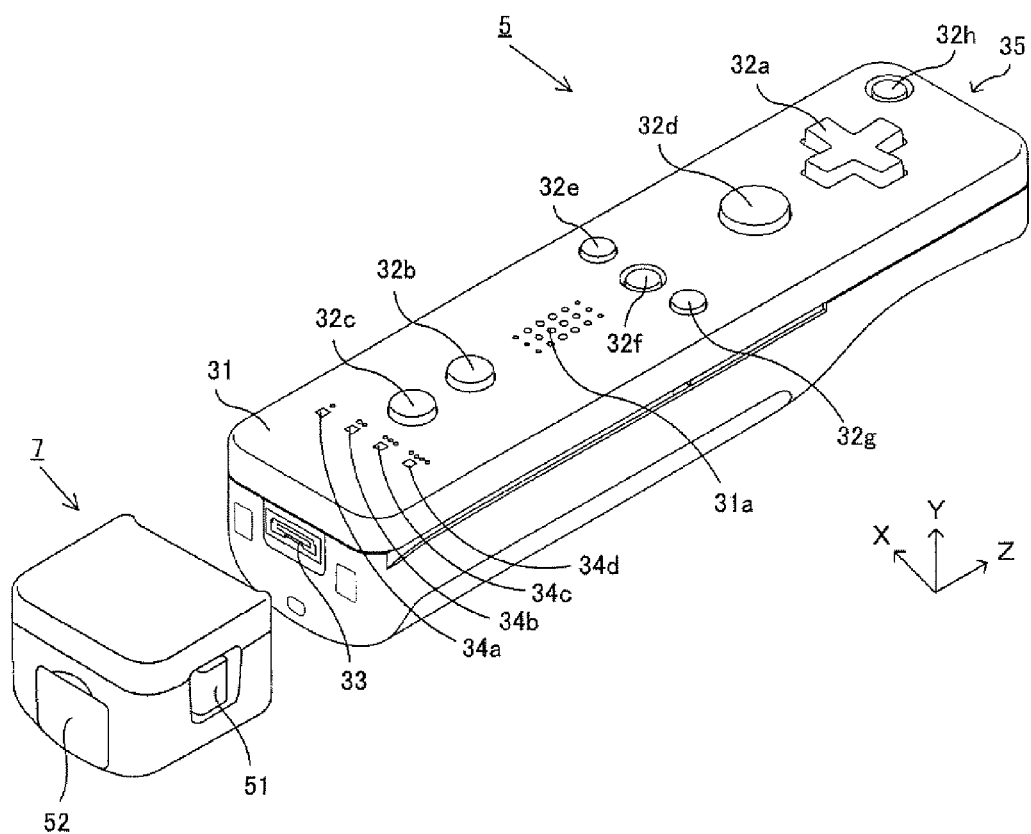
FIG. 3 is a perspective view illustrating an external structure of an input device.
Figure 4:
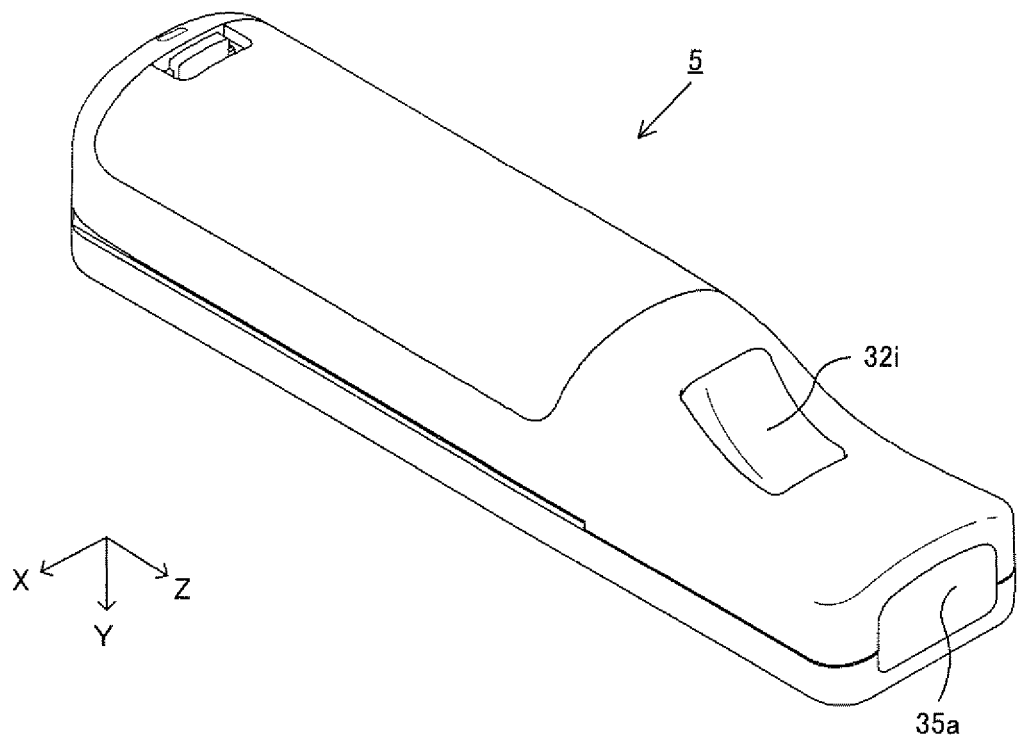
FIG. 4 is a perspective view illustrating an external structure of a controller.

Next, with reference to FIGS. 3 to 6, the input device 8 will be described. FIG. 3 is a perspective view illustrating an external structure of the input device 8. FIG. 4 is a perspective view illustrating an external structure of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
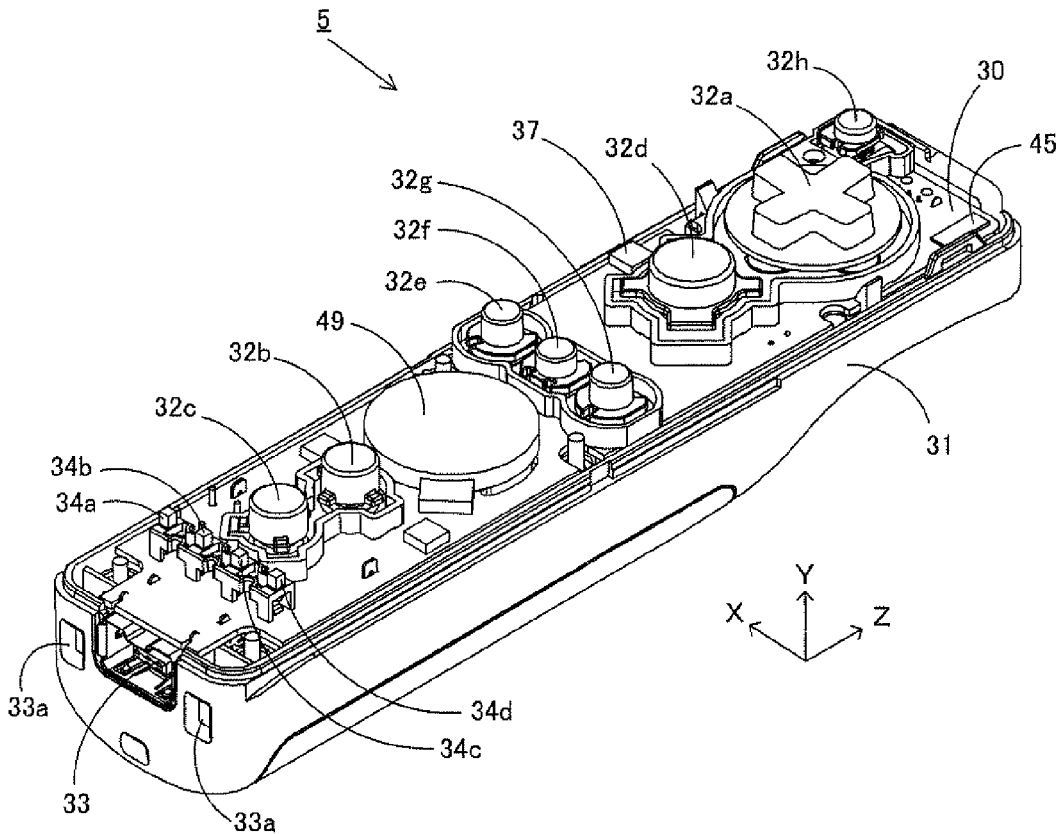
FIG. 5 is a diagram illustrating an internal structure of the controller.
Figure 6:
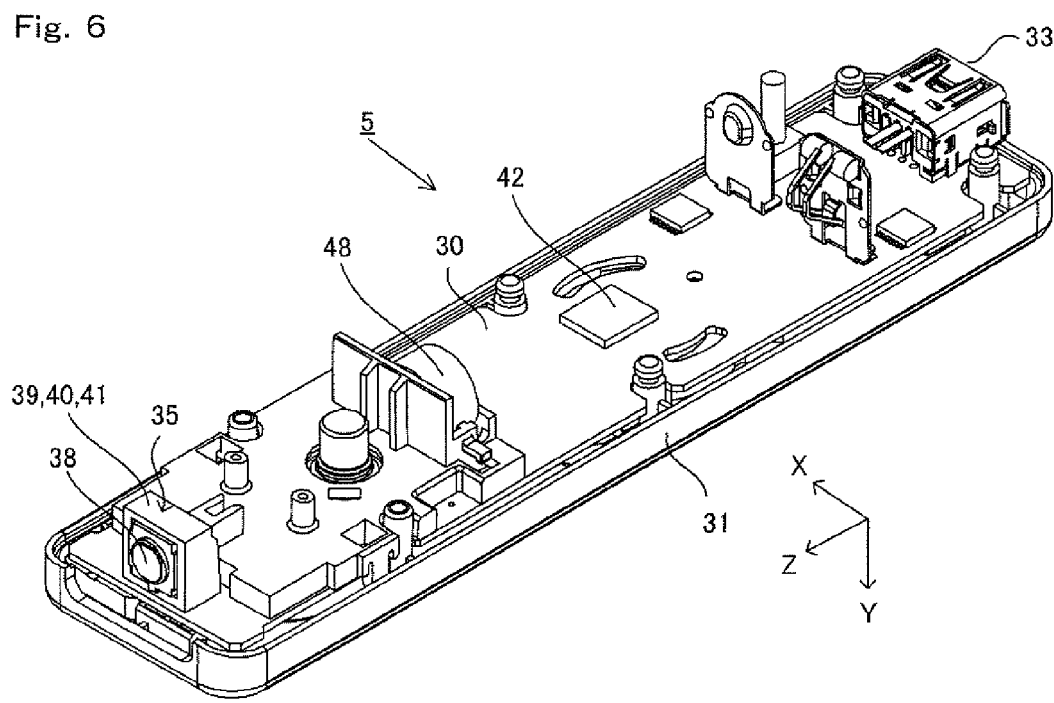
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 7 includes gyroscopes (gyroscopes 55 and 56 shown in FIG. 7) for detecting angular rates around three axes, respectively. The gyroscope unit 7 is detachably attached to the connector 33 of the controller 5. The gyroscope unit 7 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 7 is attached to the controller 5, the plug 53 is connected to the connector 33, and the hooks engage with the fastening holes 33a, respectively, of the controller 5. Therefore, the controller 5 and the gyroscope unit 7 are securely fixed to each other. Further, the gyroscope unit 7 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 7 can be disconnected from the controller 5.

Further, a connector having the same shape as the connector 33 is provided at the rear edge of the gyroscope unit 7. Therefore, another device which can be attached to (the connector 33 of) the controller 5 can be attached as well to the connector of the gyroscope unit 7. In FIG. 3, a cover 52 is detachably provided over the connector.

FIGS. 3 to 6 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
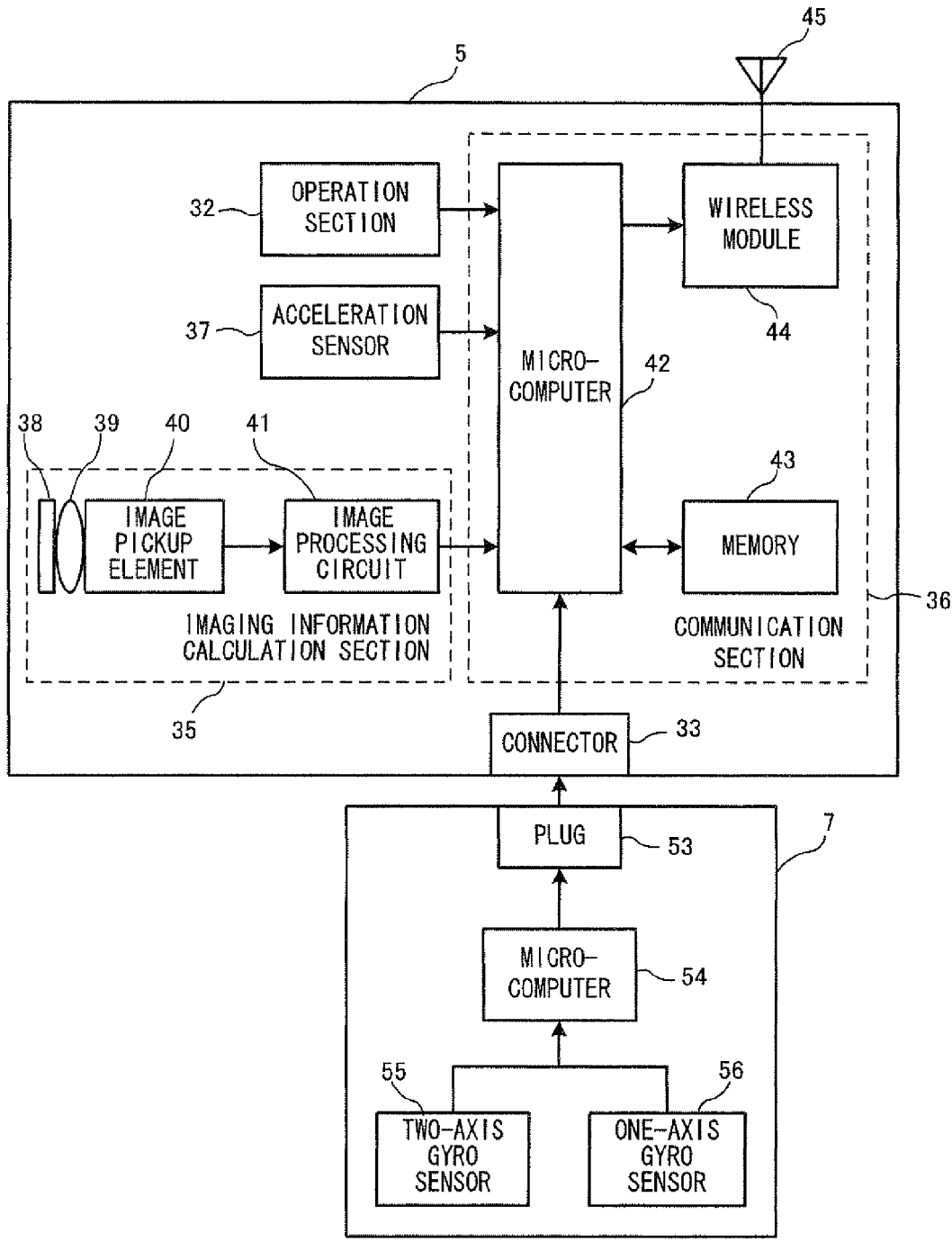
FIG. 7 is a block diagram illustrating a structure of the input device.

FIG. 7 is a block diagram illustrating a structure of the input device 8 (the controller 5 and the gyroscope unit 7). The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

The gyroscope unit 7 includes the plug 53, a microcomputer 54, the two-axis gyroscope 55, and the one-axis gyroscope 56. As described above, the gyroscope unit 7 detects angular rates around three axes (X-, Y-, and Z-axes in the present embodiment), respectively, and transmits data (angular rate data) representing the detected angular rates, to the controller 5.

The two-axis gyroscope 55 detects an angular rate (per unit time) around each of the X-axis and the Y-axis. Further, the one-axis gyroscope 56 detects an angular rate (per unit time) around the Z-axis. In the present invention, the directions of rotation around the X-axis, the Y-axis, and the Z-axis relative to the imaging direction (the Z-axis positive direction) of the controller 5 are referred to as a roll direction, a pitch direction, and a yaw direction, respectively. That is, the two-axis gyroscope 55 detects angular rates in the roll direction (the direction of rotation around the X-axis) and the pitch direction (the direction of rotation around the Y-axis), and the one-axis gyroscope 56 detects an angular rate in the yaw direction (the direction of rotation around the Z-axis).

In the present embodiment, the two-axis gyroscope 55 and the one-axis gyroscope 56 are used to detect the angular rates around the three axes. However, in another embodiment, the number of gyroscopes and a combination thereof to be used may be optionally selected, provided that the angular rates around the three axes can be detected.

Further, in the present embodiment, the three axes around which the gyroscopes 55 and 56 detect the angular rates are set to correspond to three axes (X-, Y-, and Z-axes), respectively, for which the acceleration sensor 37 detects accelerations, such that calculation in the orientation calculation process described below is facilitated. However, in another embodiment, the three axes around which the gyroscopes 56 and 57 detect the angular rates may not necessarily correspond to the three axes for which the acceleration sensor 37 detects accelerations.

Data representing the angular rates detected by the gyroscopes 56 and 57 are outputted to the microcomputer 54. That is, data representing the angular rates around the three axes, i.e., the X-, Y-, and Z-axes, are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyroscope unit 7 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, the player can perform not only a conventionally typical game operation of pressing the respective operation buttons, but also an operation of tilting the controller 5 at a desired angle of tilt. Other than these operations, the player can perform an operation of designating a desired position on a screen using the controller 5, or perform an operation of moving the controller 5 itself.

[Outline of Orientation Calculation Process]

Next, an orientation calculation process performed by the game apparatus 3 for calculating an orientation of the input device 8 will be outlined with reference to FIGS. 8 to 12. In the present embodiment, the game apparatus 3 acquires data (operation data) from the input device 8 including the gyroscopes 55 and 56, the acceleration sensor 37, and the image pickup means (the image pickup element 40), so as to calculate an orientation of the input device 8. In the present embodiment, the input device 8 includes both the acceleration sensor 37 and the image pickup element 40. However, in another embodiment, the input device 8 may include either the acceleration sensor 37 or the image pickup element 40.

The game apparatus 3 includes (1) orientation calculation means, (2) first correction means, and (3) second correction means. In the present embodiment, each of these means is realized by the game program (the orientation calculation program) executed by the computer (the CPU 10) of the game apparatus 3, which causes the computer to function as such means. In another embodiment, some or all of the aforementioned means may be realized as dedicated circuits of the game apparatus 3.

(1) Orientation Calculation Means

The orientation calculation means calculates an orientation of the input device 8 based on angular rates detected by the gyroscopes 55 and 56 (step S4 described below). The orientation may be calculated based on the angular rates in any manner. For example, a manner in which each angular rate (per unit time) is sequentially added to the initial orientation may be used. Specifically, each angular rate which is sequentially outputted from the gyroscopes 55 and 56 is integrated so as to calculate, from the result of the integration, the amount of change in orientation from the initial state, so that the current orientation can be calculated. Hereinafter, the orientation of the input device 8 calculated by the orientation calculation means based on the angular rates is referred to as the "first orientation". Note that the orientation obtained by correcting the first orientation is also referred to as the first orientation.

Erroneous detection made by the gyroscopes 55 and 56 may cause error between the first orientation calculated based on the angular rates detected by the gyroscopes 55 and 56 and the actual orientation of the input device 8. In the present embodiment, the game apparatus 3 corrects the first orientation using an acceleration detected by the acceleration sensor 37. Further, the first orientation is corrected using an image (pickup image) taken by the image pickup element 40.

(2) First Correction Means

The first correction means corrects the first orientation based on the acceleration data detected by the acceleration sensor 37 (step S5 described below). In the present embodiment, the first correction means corrects the first orientation so as to approach a second orientation. Here, the second orientation represents an orientation determined based on the acceleration data, and specifically the second orientation represents an orientation of the input device 8 obtained based on the assumption that the direction of an acceleration represented by the acceleration data is the vertically downward direction. That is, the second orientation represents an orientation calculated based on the assumption that the acceleration represented by the acceleration data is the gravitational acceleration. Hereinafter, a correction process (first correction process) performed by the first correction means will be described with reference to FIGS. 8 to 10.

Figure 8A:
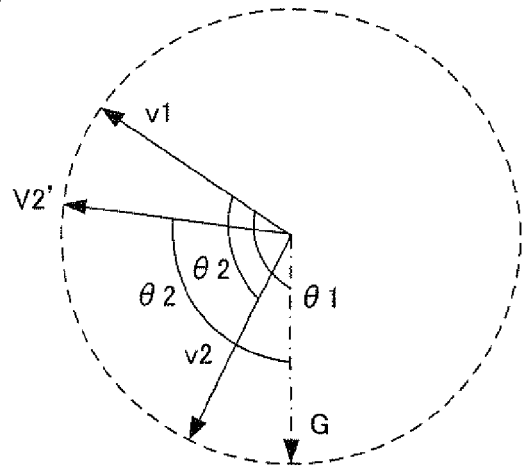
FIGS. 8A and 8B are diagrams illustrating vectors representing a first orientation and a second orientation.
Figure 8B:
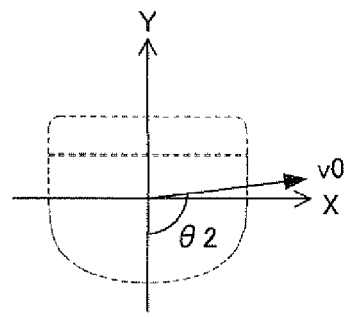

FIG. 8A and FIG. 8B are diagrams illustrating the correction of the first orientation performed using the second orientation. Although the orientation is actually processed in a three-dimensional space, a case where the orientation is processed in a two-dimensional plane will be described with reference to FIGS. 8 to 10 in the present embodiment for making the drawings easily understandable. A vector G shown in FIG. 8A represents the vertically downward direction defined in a spatial coordinate system having, as a reference point, a predetermined position in a space including the input device 8, that is, the vector represents the direction of gravity. Further, a vector v1 shown in FIG. 8A represents the direction, in the spatial coordinate system, of a vector representing the downward direction (that is, the Y-axis negative direction shown in FIGS. 3 to 5) of the input device 8 when the controller 5 is in the first orientation. When the input device 8 is in a reference orientation, the vector representing the orientation coincides with the vector G. Therefore, the vector v1 represents the first orientation in the spatial coordinate system. The first orientation may be also represented as a rotation of the vector v1 relative to the vector G, and is represented as an angle θ1 in the two-dimensional plane shown in FIG. 8A. The first orientation is calculated based on an angular rate, and therefore the vector v1 is calculated by rotating the immediately preceding orientation at the angular rate. The second orientation is calculated based on the acceleration data. A vector v2 shown in FIG. 8A represents the direction of acceleration represented by the acceleration data (the direction of an acceleration in a view coordinate system). The acceleration data represents an acceleration applied to the input device 8, and is obtained as a vector in a coordinate system defined for the input device 8. FIG. 8B shows a relationship between axes of the acceleration sensor and an acceleration vector. As shown in FIG. 8B, when θ2 represents an angle between an acceleration vector v0 obtained from the acceleration sensor and the Y-axis negative direction of the sensor, the vector v2 obtained by rotating the vector v1 by θ2 is an acceleration vector in the spatial coordinate system shown in FIG. 8A. The second orientation is "an orientation of the input device 8 obtained based on the assumption that the direction of an acceleration represented by the acceleration data is the vertically downward direction" as described above. Therefore, the rotation of angle θ2 from the vector v2 to the vector v1 represents the second orientation. When the second orientation is represented as a vector representing the downward direction of the input device 8 in the spatial coordinate system, as represented by the vector v1, the second orientation can be represented as a vector v2' obtained by rotating the vector G by θ2. Further, when the second orientation is represented as a three-dimensional orientation, the second orientation may be represented as a three-dimensional rotation matrix or the like. When the first orientation is accurately calculated based on the angular rate, and the acceleration data accurately represents the direction of gravity, the direction of the vector v2 representing the direction of acceleration coincides with the vertically downward direction in the spatial coordinate system, that is, the direction of gravity. In other words, when the first orientation is not accurately calculated based on the angular rate, and/or when the acceleration data does not accurately represent the direction of gravity, the vector v2 representing the direction of acceleration does not coincide with the vector G representing the direction of gravity as shown in FIG. 8A. For example, in static state where it is anticipated that the direction represented by the acceleration data coincides with the direction of gravity, the vector v2 may represent data corresponding to the orientation of the input device 8 more accurately than the vector v1. Further, even in the case where the input device is not static, acceleration vectors conceivably represent almost the direction of gravity on average, considering the accuracy of an average orientation within a certain period of time, and therefore the orientation based on the acceleration vector is more reliable than the orientation calculated based on the angular rate, which becomes more erroneous over time. On the other hand, when the orientation has been accurately calculated in the immediately preceding calculation, the orientation may be calculated more accurately by using the angular rate, rather than the acceleration, in the following calculation. Specifically, although error, for each calculation, in the orientation calculated based on the angular rate is smaller than that in the orientation calculated based on the acceleration, the error in orientation calculated based on the angular rate is increased over the passage of time. On the other hand, when the orientation is calculated based on the acceleration, error for each calculation may be larger in some cases but the orientation can be independently calculated in each calculation, and therefore error is not accumulated. Therefore, the first correction means makes correction considering both the first orientation and the second orientation.

Figure 9:
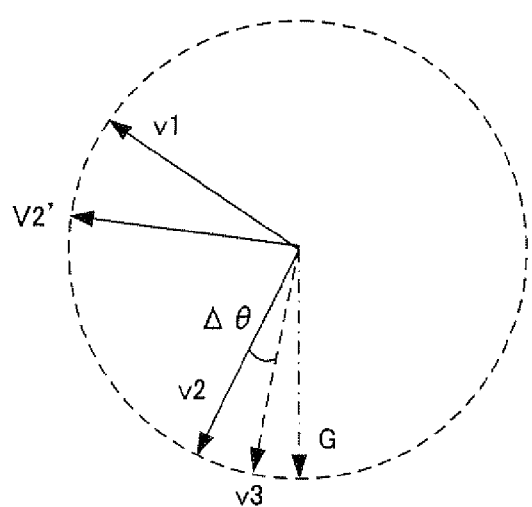
FIG. 9 is a diagram illustrating a vector v3 representing an amount of correction.

The first correction means corrects the first orientation so as to approach the second orientation. Specifically, the first correction means makes correction such that the angle θ1 approaches the angle θ2. This correction can be regarded as a correction in which the vector v1 approaches the vector v2'. However, in the case where the vector v2 has been obtained in the calculation process, even when the vector v2' is not calculated, the correction can be made. In the present embodiment, the correction is made using a vector v3 representing an amount of correction. FIG. 9 is a diagram illustrating the vector v3 representing an amount of correction. The vector v3 shown in FIG. 9 is a vector representing an amount of correction used for correcting the first orientation. Specifically, an angle Δθ between the vector v2 and the vector v3 represents the amount of correction. The vector v3 is set between the vector G and the vector v2 as described below in detail (see FIG. 9). The vector v1 approaches the vector v2' by rotating the vector v1 by Δθ.

Figure 10:
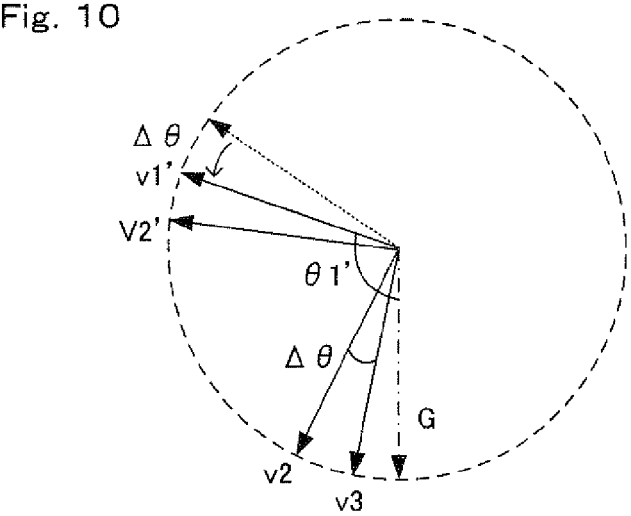
FIG. 10 is a diagram illustrating a vector representing the first orientation corrected in a first correction process.

The first correction process is performed by rotating the first orientation (the vector v1) by the amount of correction. FIG. 10 is a diagram illustrating a vector representing the first orientation corrected in the first correction process. As shown in FIG. 10, the corrected first orientation (the vector v1') is obtained by rotating the uncorrected first orientation (the vector v1) by the angle Δθ. Thus, the angle θ1' representing the corrected first orientation is between the angle θ1 and the angle θ2, and it is indicated that the correction in which the angle θ1 approaches the angle θ2 is made.

In the present embodiment, although the first correction means makes the correction in which the first orientation approaches the second orientation, the corrected first orientation does not coincide with the second orientation. The reason for this is to prevent the first orientation from being corrected so as to abruptly change even when the acceleration data is rapidly changed due to erroneous detection, vigorous operation, or the like. However, in another embodiment, the first correction means may make a correction in which the corrected first orientation coincides with the second orientation. Further, in the present embodiment, a rate at which the first correction means causes the first orientation to approach the second orientation is determined depending on the magnitude of an acceleration represented by the acceleration data (more specifically, the difference between the magnitude of the gravitational acceleration and the magnitude of the acceleration represented by the acceleration data), as described below in detail. However, in another embodiment, the rate may be a predetermined fixed value.

(3) Second Correction Means

The second correction means corrects the first orientation based on an image of a predetermined subject taken by the image pickup means (step S6 described below). In the present embodiment, the predetermined subject is the marker section 6 (the infrared LEDs thereof). In the present embodiment, the second correction means corrects the first orientation so as to approach a third orientation. The third orientation is an orientation calculated based on the image of the predetermined subject, and, specifically, the third orientation is an orientation of the input device 8, which is calculated based on a direction and/or a position of the predetermined subject in the image. Hereinafter, the correction process (the second correction process) made by the second correction means will be described with reference to FIG. 11 and FIG. 12.

Figure 11:
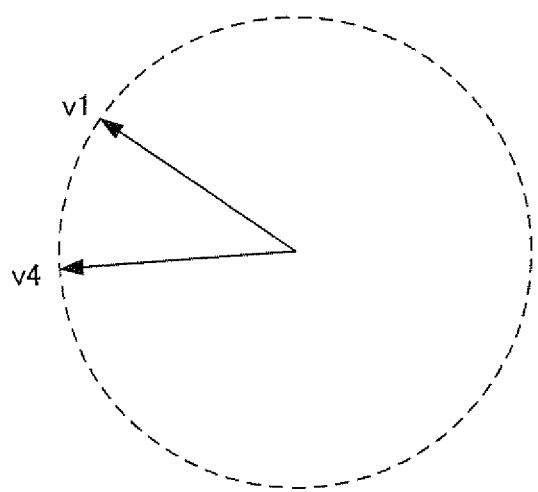
FIG. 11 is a diagram illustrating vectors representing the first orientation and a third orientation.

FIG. 11 is a diagram illustrating correction of the first orientation made by using the third orientation. Although the orientation is actually processed in the three-dimensional space, a case where the orientation is processed in the two-dimensional plane will be described in the present embodiment with reference to FIGS. 11 and 12 for making the drawings easily understandable. A vector v1 shown in FIG. 11 represents the first orientation in the spatial coordinate system. A vector v4 shown in FIG. 11 represents the third orientation in the spatial coordinate system. The position and the orientation of the marker section 6 are preset, and therefore the orientation of the input device 8 can be calculated relative to the orientation and the position of the marker in the image. Assuming that the third orientation is accurately obtained, when the first orientation is accurately calculated based on an angular rate, the vector v1 representing the first orientation coincides with the vector v4 representing the third orientation. That is, when the first orientation is not accurately calculated based on an angular rate, the vector v1 representing the first orientation does not coincide with the vector v4 representing the third orientation as shown in FIG. 11.

Figure 12:
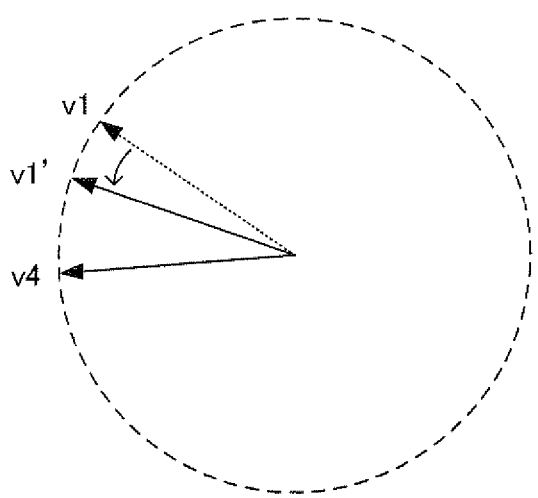
FIG. 12 is a diagram illustrating the first orientation corrected in a second correction process.

In the second correction process, the first orientation (the vector v1) approaches the third orientation (the vector v4) at a predetermined rate. FIG. 12 is a diagram illustrating the first orientation corrected in the second correction process. As shown in FIG. 12, the corrected first orientation (the vector v1') is obtained by the uncorrected first orientation (the vector v1) approaching the third orientation (the vector v4) at a predetermined rate.

In some cases, the image pickup means might fail to take an image of the marker section 6 depending on the orientation and/or the position of the input device 8, and, in such a case, the second correction means is not able to perform the second correction process. Assuming that the second correction means corrects the first orientation so as to coincide with the third orientation, when a state in which the second correction process is not allowed to be performed shifts to a state where the second correction process is allowed to be performed, the first orientation may be abruptly changed. When the first orientation is abruptly changed regardless of the player's intention as described above, the player may feel unnatural about operation (even if the orientation has been accurately corrected). In order to prevent the abrupt change, in the present embodiment, the first orientation is corrected so as to approach the third orientation at a predetermined rate. Thus, the abrupt change of the first orientation can be prevented, thereby preventing the player from feeling unnatural about operation. However, when, for example, it is anticipated that the input device 8 is used in an orientation in which the image pickup means is always allowed to take an image of the marker section 6, the second correction means may correct the first orientation so as to coincide with the third orientation in another embodiment.

Although in the present embodiment the game apparatus 3 performs both the first correction process and the second correction process, the game apparatus 3 may be configured to perform either the first correction process or the second correction process in another embodiment. Further, although in the present embodiment the game apparatus 3 firstly performs the first correction process, and subsequently performs the second correction process, the game apparatus 3 may firstly perform the second correction process, and subsequently perform the first correction process.

As described above, in the present embodiment, an orientation of the input device 8 which is calculated based on angular rates detected by the gyroscopes 55 and 56 is corrected using an acceleration detected by the acceleration sensor 37, and is further corrected using the pickup image taken by the image pickup means. Thus, error in an orientation calculated by the gyroscope can be reduced, and the orientation of the input device 8 can be calculated with enhanced accuracy.

A rotation (rotation in the yaw direction) around the direction of gravity cannot be detected based on a detection result from the acceleration sensor 37, and therefore the first correction means is not able to make any correction associated with the yaw direction. However, the correction based on the detection result from the acceleration sensor 37 is advantageous in that the correction can be made in any orientation of the input device 8 (because the acceleration can be always detected). On the other hand, when the marker section 6 is not positioned in the direction in which the input device 8 is allowed to take an image, the marker coordinate point is not detected, and therefore the second correction means might not be able to make the correction depending on the orientation of the input device 8. However, the correction using the pickup image is advantageous in that the accurate calculation of the orientation (particularly, the orientation associated with the roll direction) can be made. In the present embodiment, two types of corrections having the advantages different from each other enable an orientation of the input device 8 to be calculated with enhanced accuracy.

[Details of the Process Performed by Game Apparatus 3]

Figure 13:
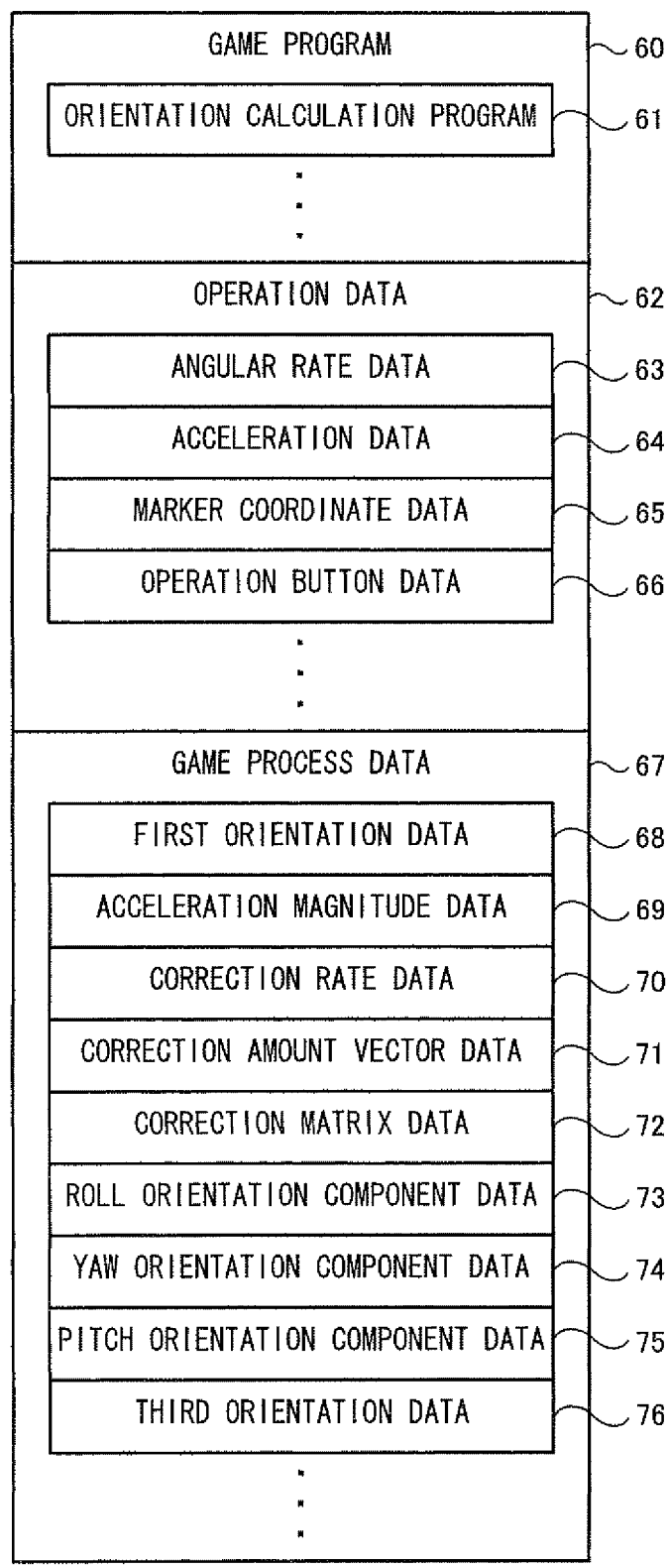
FIG. 13 is a diagram illustrating main data to be stored to a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11e) of the game apparatus 3. As shown in FIG. 13, a game program 60, operation data 62, and game process data 67 are stored in the main memory of the game apparatus 3. In addition to the data shown in FIG. 13, data necessary for the game process, such as image data of various objects appearing in a game, data representing various parameters of the objects, and the like, are stored in the main memory.

Part or all of the game program 60 is read from the optical disc 4 and stored to the main memory at an appropriate time after the game apparatus 3 is powered on. The game program 60 includes an orientation calculation program 61. The orientation calculation program 61 is a program for performing the process for calculating an orientation of the input device 8.

The operation data 62 is operation data transmitted from the controller 5 to the game apparatus 3. As described above, the operation data is transmitted from the controller 5 to the game apparatus 3 at intervals of 1/200 seconds, and the operation data 62 stored in the main memory is updated at the same intervals.

The operation data 62 includes angular rate data 63, acceleration data 64, marker coordinate data 65, and operation button data 66. The angular rate data 63 is data representing angular rates detected by the gyroscopes 55 and 56 of the gyroscope unit 7. The angular rate data 63 represents the angular rates around three axes, that is, the X-axis, the Y-axis, and the Z-axis shown in FIG. 3. Further, the acceleration data 64 is data representing an acceleration (acceleration vector) detected by the acceleration sensor 37. The acceleration data 64 represents a three-dimensional acceleration vector Va1 whose components are accelerations associated with the directions of three axes, that is, the X-axis, the Y-axis, and the Z-axis shown in FIG. 3. Further, in the present embodiment, a magnitude of the acceleration vector Va1 which is detected by the acceleration sensor 37 when the controller 5 is in static state is "1". That is, the magnitude of the gravitational acceleration detected by the acceleration sensor 37 is "1". Note that in the present embodiment, to calculate the amount of change per unit time for the acceleration, historical data representing an acceleration history is stored to the main memory. Here, the historical data contains acceleration data included in the latest operation data, as well as acceleration data included in the previous operation data.

The marker coordinate data 65 represents a coordinate point calculated by the image processing circuit 41 of the imaging information calculation section 35, that is, the data represents the marker coordinate point. The marker coordinate point is expressed by a two-dimensional coordinate system (x'y'-coordinate system shown in FIG. 17) for representing, in the plane, a position corresponding to the pickup image. When images of two markers 6R and 6L are taken by the image pickup element 40, two marker coordinate points are calculated. On the other hand, when one of the marker 6R or the marker 6L is not positioned within a range in which the image pickup element 40 is allowed to take an image, the image pickup element 40 only takes an image of one marker, and only one marker coordinate point is calculated. Further, when neither the marker 6R nor the marker 6L is positioned within the range in which the image pickup element 40 is allowed to take an image, the image pickup element 40 does not take any image of the markers, so that no marker coordinate point is calculated. Therefore, the marker coordinate data 65 may represent two marker coordinate points, one marker coordinate point, or no marker coordinate point.

The operation button data 66 is data representing an input state of each of the operation buttons 32a to 32i.

The game process data 67 is data used for a game process (FIG. 14) described below. The game process data 67 includes first orientation data 68, acceleration magnitude data 69, correction rate data 70, correction amount vector data 71, correction matrix data 72, roll orientation component data 73, yaw orientation component data 74, pitch orientation component data 75, and third orientation data 76. The game process data 67 includes various data (e.g., data representing a game parameter) used for the game process, in addition to the data shown in FIG. 13.

The first orientation data 68 is data representing the first orientation calculated using the angular rate data 63. In the present embodiment, the first orientation is represented as 3×3 matrix M1 shown in equation (1) as follows.

$$M1 = \begin{bmatrix} Xx & Yx & Zx \\ Xy & Yy & Zy \\ Xz & Yz & Zz \end{bmatrix} \quad (1)$$

The matrix M1 is a rotation matrix representing a rotation from a predetermined reference orientation to the current orientation of the input device 8. Hereinafter, the matrix M1 representing the first orientation is referred to as the "first orientation matrix M1". The first orientation represented by the first orientation matrix M1 is an orientation in an xyz-coordinate system (the spatial coordinate system described above) having, as a reference point, a predetermined position in a space including the input device 8. In the xyz-coordinate system, under the assumption that the input device 8 is positioned in front of the marker section 6, the direction from the input device 8 toward the marker section 6 is defined as the z-axis positive direction, the vertically upward direction (the direction opposite to the direction of gravity) is defined as the y-axis positive direction, and the direction to the left of the input device 8 facing the marker section 6 is defined as the x-axis positive direction. The predetermined reference orientation is an orientation in which the imaging direction of the input device 8 positioned in front of the marker section 6 faces the center of the marker section 6, and the button surface of the controller 5 faces vertically upward (that is, the predetermined reference orientation is an orientation in which the X-axis, the Y-axis, and the Z-axis based on the input device 8 correspond to the x-axis, the y-axis, and the z-axis, respectively). Although in the present embodiment the first orientation is represented using the matrix, the first orientation may be presented using a third-order vector or three angles in another embodiment.

The acceleration magnitude data 69 is data representing a magnitude (length) L of the acceleration vector Va1 represented by the acceleration data 64.

The correction rate data 70 is data representing a rate (correction rate A) at which the first orientation is corrected using the second orientation. The correction rate A represents a value in the range of $0 \leq A \leq C1$ (C1 is a predetermined constant in the range of $0 < C1 \leq 1$). As described below in detail, the greater the correction rate A is, the closer the corrected first orientation is to the second orientation.

The correction amount vector data 71 is data representing a vector (vector v3 shown in FIG. 9; hereinafter referred to as a correction amount vector) indicating an amount of correction for correcting the first orientation. The correction amount vector Vg is calculated based on the correction rate A and the vector Va2, which corresponds to the acceleration vector Va1 converted to the xyz-coordinate system.

The correction matrix data 72 is data representing a rotation matrix (referred to as a correction matrix) Ma used for correcting the first orientation. That is, in the first correction process, the first orientation is corrected by multiplying, by the correction matrix Ma, the first orientation matrix M1 representing the first orientation. The correction matrix Ma is calculated based on the vector Va2 and the correction amount vector Vg.

The roll orientation component data 73 is data representing an orientation component (roll orientation component) M3r associated with the roll direction, among all orientation components included in the third orientation calculated based on an image taken of a subject. Further, the yaw orientation component data 74 is data representing an orientation component (yaw orientation component) M3y associated with the yaw direction, among the orientation components included in the third orientation, and the pitch orientation component data 75 is data representing an orientation component (pitch orientation component) M3p associated with the pitch direction, among the orientation components included in the third orientation. The roll direction, the yaw direction, and the pitch direction described above are rotation directions relative to the imaging direction (Z-axis positive direction) of the input device 8. In the present embodiment, the orientation components M3r, M3y, and M3p are each represented as a 3×3 matrix, as with the first orientation.

The third orientation data 76 is data representing the third orientation calculated from an image taken of a subject. In the present embodiment, the third orientation is represented as a 3×3 matrix M3, as with the first orientation. Hereinafter, the matrix M3 representing the third orientation is referred to as the "third orientation matrix M3". In the present embodiment, the marker coordinate data is transmitted as the operation data from the input device 8, and the third orientation matrix M3 is calculated based on the marker coordinate data 65. Specifically, the third orientation matrix M3 is obtained by combining the orientation components M3$r$, M3$y$, and M3$p$.

Figure 14:
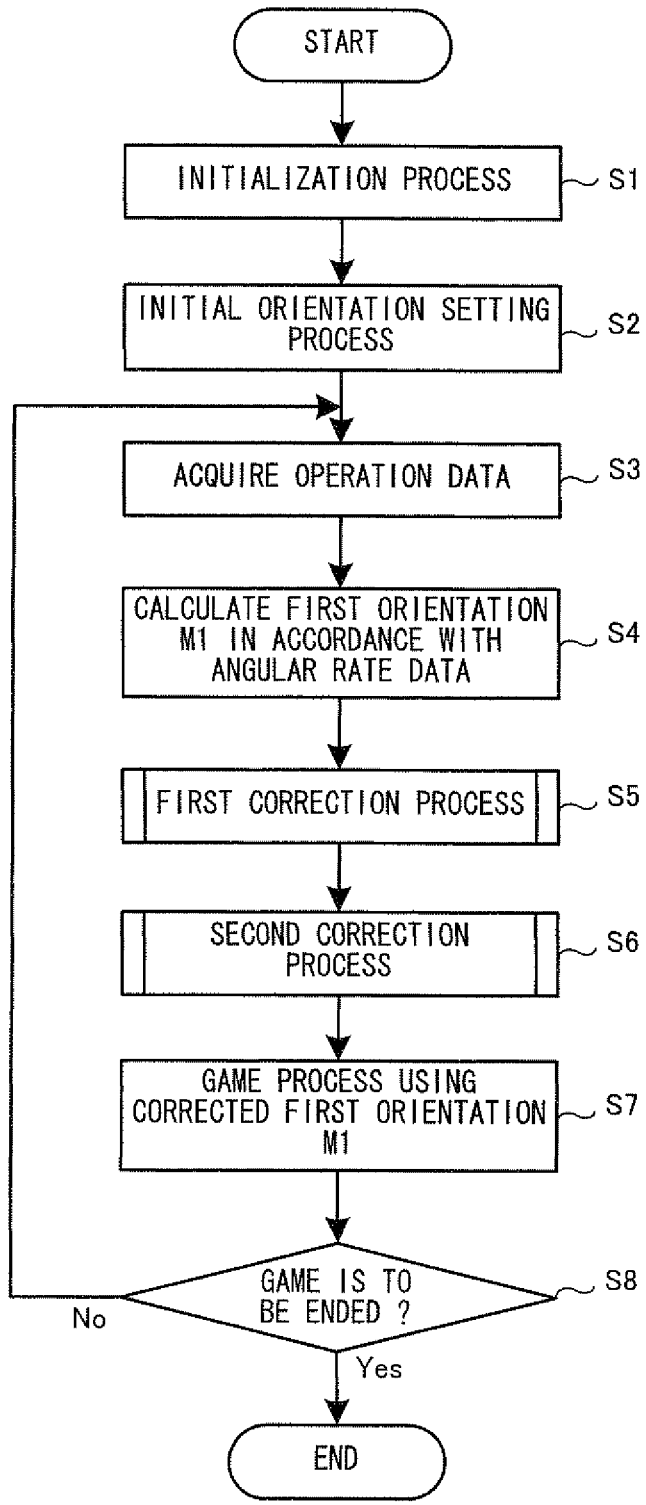
FIG. 14 is a main flow chart showing a flow of a process performed by the game apparatus.

Next, the process performed by the game apparatus 3 will be described in detail with reference to FIG. 14 to FIG. 17. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 14 illustrates a process performed when the processes described above are completed.

Firstly, in step S1, the CPU 10 executes an initialization process for the game. In the initialization process, values of various parameters used for the game process are initialized, a virtual game space is constructed, and a player object and other objects are arranged at initial positions in the game space. Following step S1, the process of step S2 is performed.

In step S2, the CPU 10 performs an initial orientation setting process. Specifically, a predetermined value is set for an initial orientation of the input device B taken as the first orientation, in accordance with a predetermined operation performed by the player (for example, an operation of pressing the A button 32$d$). The reference orientation is an orientation in which the Z-axis is parallel to the vertical direction, and the imaging direction of the input device 8 is toward the center (the middle point between the markers 6R and 6L) of the marker section 6, and therefore it is preferable that the player performs the predetermined operation while holding the input device 8 such that the initial orientation is the reference orientation. However, when the input device is almost in static state, and an image of the marker section can be taken, the initial orientation can be calculated. When the predetermined operation is performed, the CPU 10 stores data of the matrix representing the initial orientation, as the first orientation data, to the main memory. Following step S2, a process loop of steps S3 to S8 is repeatedly performed during the game play. One process loop is performed every frame time (for example, every 1/60 seconds).

Although in the present embodiment the initial orientation setting process (step S2) is performed once before the game is started (before the process loop of steps S3 to S8 is performed), the initial orientation setting process may be performed at any time while the game is being played, in another embodiment. That is, the CPU 10 may perform the initial orientation setting process each time the player performs the predetermined operation during the game play.

In step S3, the CPU 10 obtains the operation data. That is, the operation data transmitted from the controller 5 is received through the wireless controller module 19. The angular rate data, the acceleration data, the marker coordinate data, the operation button data included in the received operation data are stored to the main memory. Following step S3, the process of step S4 is performed.

In step S4, the CPU 10 calculates the first orientation based on the angular rate data 63 stored in the main memory. Any method may be used to calculate the orientation of the input device 8 based on the angular rate. In the present embodiment, the first orientation is calculated using the most recent angular rate (the angular rate obtained in the current process loop) and the first orientation obtained in the immediately preceding calculation (the first orientation calculated in the process loop immediately preceding the current process loop). Specifically, the CPU 10 sets, as the first orientation, an orientation obtained by rotating the first orientation obtained in the immediately preceding calculation, at the most recent angular rate, for a unit time period. The first orientation obtained in the immediately preceding calculation is represented by the first orientation data 6S stored in the main memory, and the most recent angular rate is represented by the angular rate data 63 stored in the main memory. Data representing the orientation (the 3×3 matrix) calculated in step S4 is stored to the main memory as an update to the first orientation data 68. Following step S4, the process of step S5 is performed.

In step S5, the CPU 10 performs the first correction process described above. The first correction process is a process for correcting the first orientation using the acceleration data. Hereinafter, the first correction process will be described in detail with reference to FIG. 15.

Figure 15:
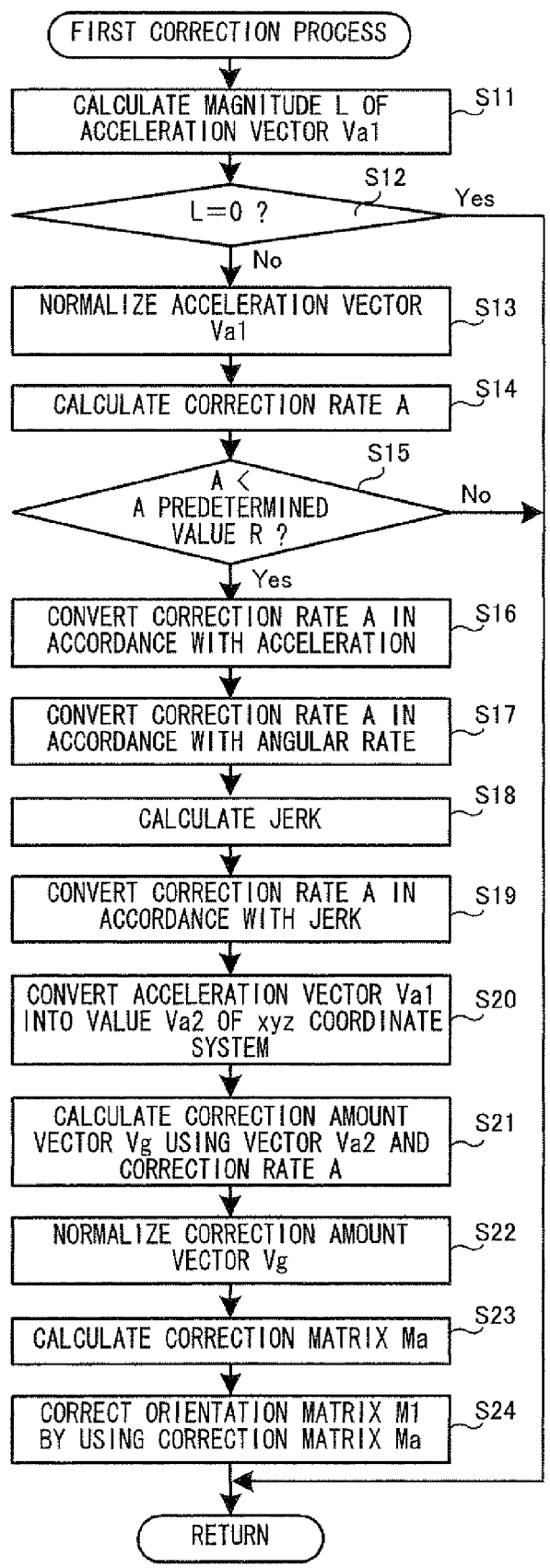
FIG. 15 is a flow chart showing a flow of the first correction process (step S5) shown in FIG. 14.

FIG. 15 is a flow chart showing a flow of the first correction process (step S5) shown in FIG. 14. In the first correction process, initially, the CPU 10 calculates a magnitude L of an acceleration detected by the acceleration sensor 37 in step S11. Specifically, the acceleration data 64 stored in the main memory is read, and the magnitude L of the acceleration vector Va1 represented by the acceleration data 64 is calculated. Data representing the calculated magnitude L is stored as the acceleration magnitude data 69 to the main memory. Following step S11, the process of step S12 is performed.

In step S12, the CPU 10 determines whether or not the magnitude of the acceleration detected by the acceleration sensor 37 is 0. That is, the acceleration magnitude data 69 stored in the main memory is read, and whether or not the magnitude L represented by the acceleration magnitude data 69 is 0 is determined. When a determination result of step S12 is negative, the process of step S13 is performed. On the other hand, when the determination result of step S12 is affirmative, the processes of subsequent steps S13 to S21 are skipped, and the CPU 10 ends the first correction process. Thus, in the present embodiment, when the magnitude of the acceleration detected by the acceleration sensor 37 is 0, the correction using the acceleration is not made. This is because when the magnitude of the acceleration is 0, the direction of gravity cannot be calculated based on the detection result from the acceleration sensor 37, and when the magnitude of the acceleration vector represents 0, the processes of subsequent steps S13 to S21 are difficult to perform.

In step S13, the CPU 10 normalizes the acceleration vector Va1 detected by the acceleration sensor 37. Specifically, the acceleration data 64 stored in the main memory is read, and the acceleration vector Va1 represented by the acceleration data 64 is transformed so as to have a magnitude of 1. The CPU 10 stores, to the main memory, data representing the acceleration vector Va1 having been normalized. Following step S13, the process of step S14 is performed.

In step S14, the CPU 10 calculates the correction rate A representing a rate at which the first orientation is corrected in the first correction process. The correction rate A is calculated based on the magnitude L of the acceleration vector Va1 not having been normalized. Specifically, the CPU 10 reads the acceleration magnitude data 69 stored in the main memory. The correction rate A is calculated using the magnitude L represented by the acceleration magnitude data 69 in accordance with equation (2) as follows.

$$A = |L-1| \qquad (2)$$

Data representing the correction rate A calculated in accordance with equation 2 is stored as the correction rate data 70 to the main memory. The correction rate A calculated in accordance with equation (2) does not represent a final value but represents a value being calculated, and the value is converted in the following step S16 so as to obtain a final value of the correction rate A. Following step S14, the process of step S15 is performed.

In step S15, the CPU 10 determines whether or not the correction rate A calculated in step S14 is smaller than a predetermined value R. The predetermined value R is preset to, for example, 0.4. As described above, in the present embodiment, the magnitude of the gravitational acceleration detected by the acceleration sensor 37 represents "1", and further the correction rate A represents an absolute value of the difference between "1" and the magnitude L of the acceleration vector Va1 (as represented by equation (2)). Therefore, when the correction rate A is greater than or equal to the predetermined value R, the magnitude L of the acceleration vector Va1 differs from the magnitude of the gravitational acceleration by the predetermined value R or more. When the determination result of step S15 is affirmative, the process of step S16 is performed. On the other hand, when the determination result of step S15 is negative, the processes of subsequent steps S16 to S24 are skipped, and the CPU 10 ends the first correction process.

As described above, in the present embodiment, only when the difference between the magnitude L of an acceleration detected by the acceleration sensor 37 and the magnitude (=1) of the gravitational acceleration is smaller than a predetermined reference (the predetermined value R), the correction is made, and when the difference between the magnitude L and the magnitude of the gravitational acceleration is greater than or equal to the predetermined reference, the correction is not made. In a state where the input device 8 is being moved, an acceleration caused due to inertia generated by movement of the input device 8 is detected by the acceleration sensor 37 in addition to the gravitational acceleration, and the magnitude L of the detected acceleration vector Va1 represents a value other than "1", and when the input device 8 is being vigorously moved, the magnitude L represents a value which is substantially away from "1". Therefore, when the difference between the magnitude L and the magnitude of the gravitational acceleration is greater than or equal to the predetermined reference, it is assumed that the input device 8 is being vigorously moved. On the other hand, when the input device 8 is being vigorously moved, the acceleration vector Va1 detected by the acceleration sensor 37 contains a lot of components (components of an acceleration due to the inertia) other than the gravitational acceleration, and therefore the value of the acceleration vector Va1 is presumably unreliable as a value representing the direction of gravity. Therefore, in the determination process of step S15, whether or not the input device 8 is being vigorously moved is determined, in other words, whether or not the value of the acceleration vector Va1 is reliable as a value representing the direction of gravity is determined. In the present embodiment, when it is determined in the determination process of step S15 that the value of the acceleration vector Va1 is not reliable as a value representing the direction of gravity, the correction is not made, and only when the value of the acceleration vector Va1 is reliable of a value representing the direction of gravity, the correction is made. Thus, it is possible to prevent inaccurate correction of the first orientation due to the first orientation being corrected using the acceleration vector Va1 which is not reliable as a value representing the direction of gravity.

In step S16, the CPU 10 converts the value of the correction rate A in accordance with the acceleration of the input device 8. In the present embodiment, the correction rate A is converted such that the closer the magnitude L of the detected acceleration vector Va1 is to the magnitude of the gravitational acceleration, the closer the correction rate A is to 1. Specifically, the CPU 10 reads the correction rate data 70 stored in the main memory, and converts the correction rate A represented by the correction rate data 70 in accordance with equations (3) to (5) as follows.

$$A2 = 1 - (A1/R) \tag{3}$$

$$A3 = A2 \times A2 \tag{4}$$

$$A4 = A3 \times C1 \tag{5}$$

In equations (3) to (5), variable A1 represents a non-converted correction rate (a value represented by the correction rate data 70 currently stored in the main memory), and variable A4 is a correction rate to be finally obtained through the conversion in step S16. In equation (3), the correction rate A2 is obtained through the conversion such that the closer the magnitude of the non-converted correction rate A1 is to the magnitude (=1) of the gravitational acceleration, the closer the magnitude of the converted correction rate A1 is to 1. In equation (4), the correction rate A3 is obtained through the conversion such that the closer the non-converted correction rate A2 is to 1, the greater the weight of the converted correction rate A2 is. In equation (5), the amount of correction is adjusted. That is, the greater the value of constant C1 is, the greater the amount of correction is. Constant C1 is preset to a value (for example, 0.03) in the range of $0 < C1 \leq 1$. Data representing the correction rate A4 obtained through the conversion using equations (3) to (5) is stored to the main memory as an update to the correction rate data 70. Following step S16, the process of step S17 is performed.

Although in the present embodiment the conversions are performed using equations (3) to (5), part or all of the conversions using equations (3) to (5) may be eliminated in another embodiment. However, when the conversion using equation (3) is eliminated, it is necessary to replace the acceleration vector Va2 with the direction-of-gravity vector (0,−1, 0) in equation (7) used in step S20 described below.

According to step S16, the correction rate A increases as the difference between the magnitude L of the acceleration vector Va1 and the magnitude of the gravitational acceleration decreases, i.e., as the reliability of the acceleration vector Va1 increases. As will be described in detail later, in the first correction process, the first orientation is corrected such that the higher the correction rate A is, the more closely the first orientation approaches the second orientation. That is, the higher the reliability of the acceleration vector Va1 is, the more deeply the second orientation is reflected in the corrected first orientation. In this manner, according to the present embodiment, the amount of correction in the first correction process depends on the reliability of the acceleration sensor vector Va1, and therefore can be appropriately determined based on the reliability. Thus, the game apparatus 3 can calculate the orientation of the input device 8 with enhanced accuracy.

In step S17, the CPU 10 converts the correction rate A in accordance with the angular rate of the input device 8. Concretely, the correction rate A is converted so as to decrease as the angular rate increases. In the present embodiment, the conversion of the correction rate A is performed by multiplying the correction rate A by a factor K1, which changes in accordance with the angular rate. The factor K1 is "1" when the angular rate ω is 0, and "0" when the angular rate ω is a predetermined value T or more (e.g., T=60 [deg/sec]), and the factor decreases as the angular rate ω increases (where $0 \leq \omega \leq T$). For example, the factor K1 may be calculated such that "K1=1−(ω/T)", or may be calculated such that "K1={1− (ω/T)}²" in order to increase the weight of the factor as the angular rate ω approximates 0. Concretely, the CPU 10 reads the angular rate data 63 stored in the main memory, and calculates the factor K1 based on the angular rate ω represented by the angular rate data 63. Thereafter, the CPU 10 reads the correction rate data 70 stored in the main memory, and multiplies the correction rate A represented by the correction rate data 70 by the factor K1, thereby obtaining new correction rate A. Data representing the new correction rate A is stored to the main memory as an update to the correction rate data 70. Following step S17, the process of step S18 is performed.

Here, when the input device 8 has a high angular rate, it is implied that the input device 8 is being moved vigorously, and in such a case, the acceleration vector Va1 is conceivably unreliable as a value indicating the direction of gravity. On the other hand, when the angular rate is low, it is implied that the input device 8 is not being moved vigorously, and the acceleration vector Va1 is conceivably reliable. Accordingly, in step S17, as in step S16, the correction rate A can be set to increase as the reliability of the acceleration vector Va1 increases (as the angular rate decreases). As a result, the amount of correction can be appropriately determined in accordance with the reliability of the acceleration sensor vector Va1, as described in conjunction with step S16, and furthermore, the orientation of the input device 8 can be calculated with enhanced accuracy. Also, in step S16, the degree of movement of the input device 8 (the reliability of the acceleration vector Va1) is determined based on the acceleration of the input device 8, whereas in step S17, the degree of movement is determined based on the angular rate of the input device 8. In this manner, the reliability is determined based on a variable different from that in step S16, and therefore even in the case where the reliability cannot be determined correctly in step S16 (e.g., in the case where the input device 8 is being moved and the acceleration vector Va1 happens to be equal in magnitude to the gravitational acceleration), the reliability can be determined correctly in step S17.

In step S18, the CPU 10 calculates the amount of change (also referred to as the "jerk") per unit time for the acceleration of the input device 8. Concretely, the historical data stored in the main memory is read. As described above, the historical data contains acceleration data obtained by the previous process loop of steps S3 to S8 and acceleration data obtained by the current process loop of steps S3 to S8. The CPU 10 calculates the amount of change per unit time for the acceleration based on the magnitude of a vector calculated by subtracting an acceleration vector represented by the current acceleration data from an acceleration vector represented by the previous acceleration data. Change amount data representing the calculated amount of change is stored to the main memory. Following step S18, the process of step S19 is performed.

In step S19, the CPU 10 converts the correction rate A in accordance with the amount of change (jerk) per unit time for the acceleration of the input device 8. In the present embodiment, the correction rate A is converted so as to decrease as the amount of change increases. As will be described in detail later, the conversion of the correction rate A in accordance with the amount of change makes it possible to calculate the first orientation with enhanced accuracy in the first correction process.

The conversion of the correction rate A in step S19 can be performed in a manner similar to the conversion in step S17. Specifically, the conversion is performed by multiplying the correction rate A by a factor K2, which changes in accordance with the amount of change. The factor K2 is "1" when the amount of change J is 0, and "0" when the amount of change J is a predetermined value U or more (e.g., U=40 [G/sec]), and the factor decreases as the amount of change J increases (where $0 \leq J \leq U$). For example, the factor K2 may be calculated such that "K2=1−(J/U)", or may be calculated such that "K2={1−(J/U)}$^2$", in order to increase the weight of the factor as the amount of change J approximates 0. Concretely, the CPU 10 reads the change amount data stored in the main memory, and calculates the factor K2 based on the amount of change represented by the change amount data. Thereafter, the CPU 10 reads the correction rate data 70 stored in the main memory, and multiplies the correction rate A represented by the correction rate data 70 by the factor K2, thereby obtaining new correction rate A. Data representing the new correction rate A is stored to the main memory as an update to the correction rate data 70. Following step S19, the process of step S20 is performed.

Here, when the input device 8 has a high amount of change per unit time for the acceleration, it is implied that the input device 8 is being moved vigorously, and in such a case, the acceleration vector Va1 is conceivably unreliable, as described above. On the other hand, when the amount of change is low, it is implied that the input device 8 is not being moved vigorously, and the acceleration vector Va1 is conceivably reliable. Accordingly, in step S19, as in steps S16 and S17, the correction rate A can be set to increase as the reliability of the acceleration vector Va1 increases (as the amount of change decreases). As a result, the amount of correction can be appropriately determined in accordance with the reliability of the acceleration sensor vector Va1, as described in conjunction with step S16, and furthermore, the orientation of the input device 8 can be calculated with enhanced accuracy.

Also, in step S19, the degree of movement of the input device 8 (the reliability of the acceleration vector Va1) is determined based on a variable different from those in steps S16 and S17. Therefore, even in the case where the reliability cannot be determined correctly in steps S16 and S17, so that the correction rate A remains relatively high (e.g., in the case where the input device S is being translated without rotation and the acceleration vector Va1 happens to be equal in magnitude to the gravitational acceleration), the correction rate A can be changed to a lower value in step S19, making it possible to correctly determine the reliability.

As described above, in the present embodiment, the reliability of the acceleration vector Va1 is determined in steps S16, S17, and Sl9 using three different variables each representing the state of the input device 8. Thus, the reliability of the acceleration vector Va1 can be determined with enhanced accuracy, so that the amount of correction can be appropriately determined in accordance with the reliability. Therefore, the game apparatus 3 can calculate the orientation of the input device 8 with enhanced accuracy. Note that in another embodiment, the CPU 10 may perform only one or two of the processes of steps S16, S17, and S19, rather than all the processes of steps S16, S17, and S19.

Also, in another embodiment, a process similar to the process of step S15 performed for the difference in magnitude between the acceleration of the input device 8 and the gravitational acceleration, may be performed by the CPU 10 on the angular rate and/or jerk of the input device 8 as well. Specifically, the CPU 10 may perform the correction in the first correction process only when the angular rate or the jerk is lower than a predetermined reference value. Moreover, in the present embodiment, the correction rate A is converted in steps S16 through S19, but in another embodiment, the conversion may be performed as necessary in any one or two of the steps, rather than in all the steps.

In step S20, the CPU 10 converts the acceleration vector Va1 represented by the XYZ-coordinate system into a value Va2 in the xyz-coordinate system. The acceleration vector Va2 in the xyz-coordinate system is calculated by converting the acceleration vector Va1 having been normalized, using the first orientation matrix M1 representing the first orientation obtained in the immediately preceding frame. That is, the CPU 10 reads data of the (normalized) acceleration vector Va1 stored to the main memory in step S13, and the first orientation data 68. The acceleration vector Va2 in the xyz-coordinate system is calculated using the acceleration vector Va1 and the first orientation matrix M1 represented by the first orientation data 68. More specifically, the acceleration vector Va1 having been normalized is represented as Va1=(nx,ny,nz), and the components of the first orientation matrix M1 are represented as variables, respectively, in equation (1), and the acceleration vector Va2 to be represented by the xyz-coordinate system is represented as Va2=(vx,vy,vz). In this case, the acceleration vector Va2 is calculated in accordance with equation (6) as follows.

$$vx = Xx \times nx + Yx \times ny + Zx \times nz$$

$$vy = Xy \times nx + Yy \times ny + Zy \times nz$$

$$vz = Xz \times nx + Yz \times ny + Zz \times nz \quad (6)$$

As represented in equation (6), the acceleration vector Va2 is obtained by rotating the acceleration vector Va1 using the first orientation matrix M1, which is a rotation matrix. The acceleration vector Va2 calculated in step S20 is stored to the main memory. Following step S20, the process of step S21 is performed.

In step S21, the CPU 10 calculates the correction amount vector Vg using the correction rate A and the acceleration vector Va2 represented by the xyz-coordinate system. The correction amount vector Vg is calculated using the correction rate obtained through the conversion in step S16, and the vector (0,−1,0) representing the vertically downward direction (the direction of gravity) in the xyz-coordinate system. Specifically, the CPU 10 reads the correction rate data 70 stored in the main memory, and calculates the correction amount vector Vg=(gx,gy,gz) using the correction rate A represented by the correction rate data 70 in accordance with equation (7) as follows.

$$gx = (0-vx) \times A + vx$$

$$gy = (-1-vy) \times A + vy$$

$$gz = (0-vz) \times A + vz \quad (7)$$

As represented in equation (7), the correction amount vector Vg is a vector having an end point at which a line segment connecting from an end point of the acceleration vector Va2 to an end point of the direction-of-gravity vector (0,−1,0) is internally divided at A:(1−A). Therefore, the greater the value of the correction rate A is, the closer the correction amount vector Vg is to the direction-of-gravity vector. The CPU 10 stores data representing the correction amount vector Vg calculated in equation (7) to the main memory as the correction amount vector data 71. Following step S21, the process of step S22 is performed.

In step S22, the CPU 10 normalizes the correction amount vector Vg calculated in step S21. That is, the correction amount vector data 71 stored in the main memory is read, and a vector represented by the correction amount vector data 71 is normalized. Data representing the normalized vector is stored to the main memory as an update to the correction amount vector data 71. The correction amount vector Vg calculated in step S22 corresponds to the vector v3 shown in FIG. 9. Following step S22, the process of step S23 is performed.

In step S23, the CPU 10 calculates the correction matrix Ma for correcting the first orientation. The correction matrix Ma is calculated based on the acceleration vector Va2 represented by the xyz-coordinate system, and the correction amount vector Vg obtained through the normalization in step S22. Specifically, the CPU 10 reads the acceleration vector Va2 stored to the main memory in step S20, and the correction amount vector data 71. A rotation matrix for rotating the acceleration vector Va2 so as to coincide with the correction amount vector Vg is calculated, and the calculated rotation matrix is set as the correction matrix Ma. That is, the correction matrix Ma is a rotation matrix for performing rotation by an angle $\Delta\theta$ shown in FIG. 9. Data representing the correction matrix Ma calculated in step S23 is stored to the main memory as the correction matrix data 72. Following step S23, the process of step S24 is performed.

In step S24, the CPU 10 corrects the first orientation matrix M1 representing the first orientation using the correction matrix Ma. Specifically, the CPU 10 reads the first orientation data 68 and the correction matrix data 72 stored in the main memory. The first orientation matrix M1 represented by the first orientation data 68 is converted using the correction matrix Ma represented by the correction matrix data 72 (a product of the first orientation matrix M1 and the correction matrix Ma is calculated). The converted first orientation matrix M1 represents the corrected first orientation. That is, in the process of step S24, the vector v1 shown in FIG. 10 is rotated by the angle $\Delta\theta$. The CPU 10 stores data representing the converted first orientation matrix M1 to the main memory as an update to the first orientation data 68. Following step S24, the CPU 10 ends the first correction process.

As described above, in the first correction process, calculated is the correction amount vector Vg between the acceleration vector detected by the acceleration sensor 37 and the direction-of-gravity vector (vector G shown in FIG. 8A) (steps S21 and S22), and the first orientation is corrected by a correction amount (the correction matrix Ma; the angle $\Delta\theta$ shown in FIG. 9) represented by the correction amount vector Vg (step S24). Thus, the first orientation (the vector v1 or the angle $\theta 1$ shown in FIG. 8A) calculated by the gyroscopes 55 and 56 is corrected so as to approach the second orientation (the angle $\theta 2$ shown in FIG. 8A) determined by the acceleration sensor 37. Through this correction, the first orientation is corrected so as to represent a more accurate value.

Further, in the first correction process, the higher the reliability of the acceleration vector Va1 is, the greater the value of the correction rate A is, so that the first orientation is corrected so as to more closely approach the second orientation. In other words, the higher the reliability of the acceleration vector Va1 is, the greater the amount of correction is, so that the second orientation is deeply reflected in the corrected first orientation. Thus, in the present embodiment, the amount of correction for the first correction process is determined based on the reliability of the acceleration sensor vector Va1, and therefore the amount of correction is appropriately determined in accordance with the reliability, which leads to accurate calculation of the orientation of the input device 8.

In the present embodiment, the correction amount vector Vg calculated in step S21 is a vector having an end point at which a line segment connecting from an end point of the acceleration vector Va2 to an end point of the direction-of-gravity vector is internally divided at A:(1−A), and the greater the value of the correction rate A is, the closer the correction amount vector Vg is to the direction-of-gravity vector. In another embodiment, depending on the method for calculating the correction rate A, the correction amount vector Vg may be determined such that the correction amount vector Vg is a vector having an end point at which a line segment connecting from an end point of the direction-of-gravity vector to an end point of the acceleration vector Va2 is internally divided at (1−A):A, and the smaller the value of the correction rate A is, the closer the correction amount vector Vg is to the direction-of-gravity vector. In this case, in step S23, a rotation matrix for rotating the correction amount vector Vg so as to coincide with the direction of gravity is calculated, and the calculated rotation matrix is set as the correction matrix Ma. Also in this case, the correction can be similarly performed as in the present embodiment.

Returning to the description of FIG. 14, in step S6, following step S5, the CPU 10 performs the second correction process described above. The second correction process is a process for correcting the first orientation using the marker coordinate data. Hereinafter, the second correction process will be described in detail with reference to FIG. 16.

Figure 16:
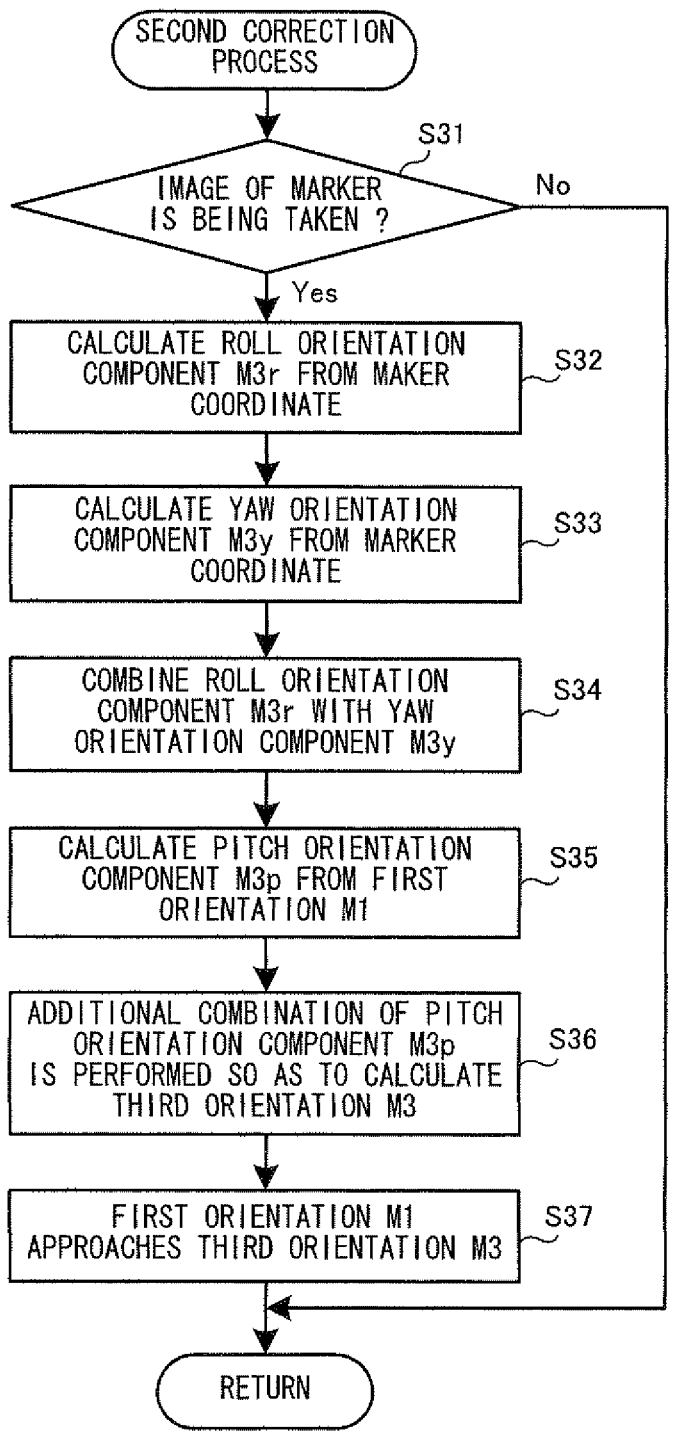
FIG. 16 is a flow chart showing a flow of the second correction process (step S6) shown in FIG. 14.

FIG. 16 is a flow chart showing a flow of the second correction process (step S6) shown in FIG. 14. In the first correction process, firstly, in step S31, the CPU 10 determines whether or not an image of the marker section 6 is taken by the image pickup means (the image pickup element 40) of the input device 8. The determination of step S31 can be performed by referring to the marker coordinate data 65 stored in the main memory. When the marker coordinate data 65 represents two marker coordinate points, it is determined that the image of the marker section 6 is taken, and when the marker coordinate data 65 only represents one marker coordinate point, or when the marker coordinate point is not obtained, it is determined that the image of the marker section 6 is not taken. When the determination result of step S31 is affirmative, the processes of subsequent steps S32 to S37 are performed. On the other hand, when the determination result of step S31 is negative, the processes of subsequent steps S32 to S37 are skipped, and the CPU 10 ends the second correction process. Thus, when the image of the marker section 6 is not taken by the image pickup element 40, the orientation of the input device 8 cannot be calculated using data obtained from the image pickup element 40. Therefore, in this case, the correction is not made in the second correction process.

In step S32, the CPU 10 calculates the roll orientation component M3r based on the marker coordinate data. The roll orientation component M3r is calculated based on the direction of the marker section 6 in the pickup image, that is, based on a tilt of a line connecting between two marker coordinate points represented by the marker coordinate data 65. Hereinafter, an exemplary method for calculating the roll orientation component M3r will be described with reference to FIG. 17.

Figure 17:
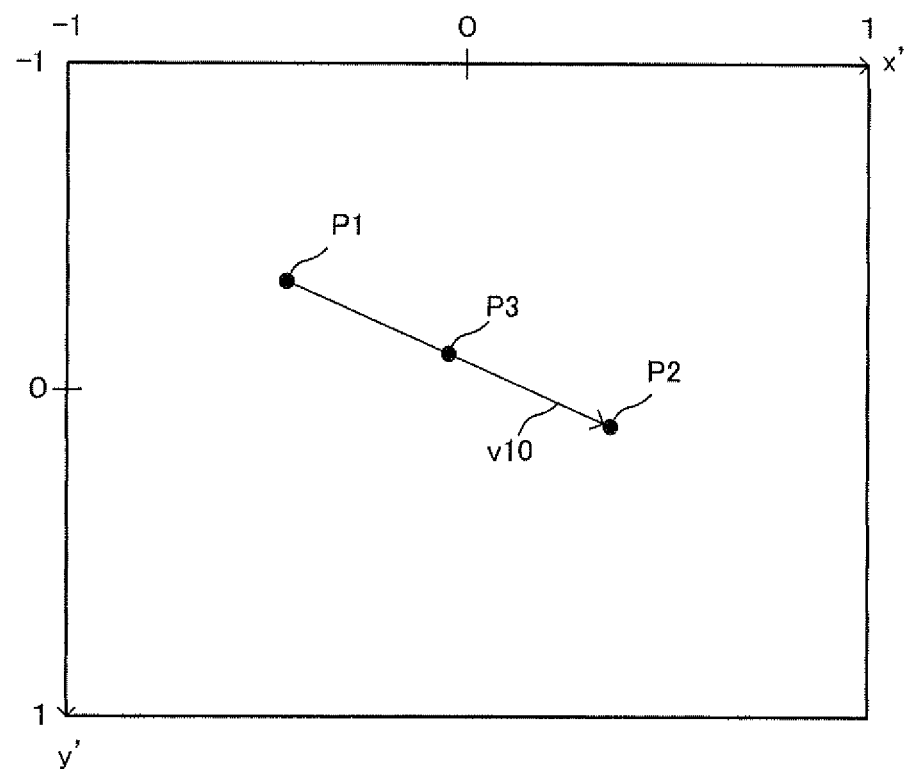
FIG. 17 is a diagram illustrating a two-dimensional coordinate point corresponding to a pickup image.

FIG. 17 is a diagram illustrating a two-dimensional coordinate system for the pickup image. As shown in FIG. 17, in the present embodiment, in a two-dimensional coordinate system (x'y' coordinate system) for representing positions in the pickup image, the range of the pickup image is represented so as to satisfy −1≦x'≦1, and −1≦y'≦1. In the x'y' coordinate system, when the input device 8 is in the reference orientation (an orientation in which the imaging direction of the input device 8 is toward the center of the marker section 6, and the button surface of the controller 5 is oriented to the vertically upward direction), the vertically downward direction in the pickup image corresponds to the y'-axis positive direction, and the rightward direction therein corresponds to the x'-axis positive direction. Further, a point P1 and a point P2 shown in FIG. 17 represent marker coordinate positions, and a point P3 is a middle point between the point P1 and the point P2. The vector v10 shown in FIG. 17 is a vector starting from the point P1 and ending at the point P2.

In order to calculate the roll orientation component M3r, the CPU 10 firstly reads the marker coordinate data 65, and calculates the vector v10 based on the two marker coordinate points represented by the marker coordinate data 65. Further, a vector (hx,hy) obtained by normalizing the vector v10 is calculated. The vector (hx,hy) represents the x'-axis positive direction when the input device 8 is in the reference orientation, and changes its direction in accordance with the input device 8 rotating in the roll direction. The vector (hx,hy) represents the orientation associated with the roll direction, and the roll orientation component M3r can be calculated based on the vector (hx,hy). Specifically, the CPU 10 calculates the roll orientation component M3r in accordance with equation (8) as follows.

$$M3r = \begin{bmatrix} hx & -hy & 0 \\ hy & hx & 0 \\ 0 & 0 & 1 \end{bmatrix} \quad (8)$$

Data representing a matrix calculated in accordance with equation (11) is stored to the main memory as the roll orientation component data 73. Following step S32, the process of step S33 is performed.

In step S33, the CPU 10 calculates the yaw orientation component M3y based on the marker coordinate data. The yaw orientation component M3y is calculated based on the direction and the position of the marker section 6 in the pickup image. Hereinafter, an exemplary method for calculating the yaw orientation component M3y will be described with reference to FIG. 17.

Firstly, the CPU 10 reads the marker coordinate data 65, and calculates a middle point between the two marker coordinate points represented by the marker coordinate data 65. In the present embodiment, the middle point represents the position of the marker section 6. Further, the CPU 10 calculates a coordinate point (px,py) by rotating a coordinate point representing the calculated middle point, by a rotation angle associated with the roll direction of the input device 8, around the origin of the x'y' coordinate system (in the direction opposite to the rotation direction of the input device 8). In other words, the coordinate point representing the middle point is rotated around the origin such that the vector (hx,hy) represents the x-axis positive direction. When the input device 8 and the marker section 6 are positioned at the same lateral (the x-axis direction) position (that is, the input device 8 is in front of the marker section 6), the orientation associated with the yaw direction can be calculated from the coordinate point (px,py) obtained through the rotation described above.

Next, the CPU 10 calculates the rotation angle θy associated with the yaw direction based on the coordinate point (px,py) obtained by rotating the middle point, and an angle (limit angle) θy', in the yaw direction, which is obtained when the marker section 6 is at the edge in the x'-axis direction. The limit angle θy' and an x-coordinate value px' which corresponds to the limit angle θy' and is obtained by rotating the middle point, can be obtained in advance. Therefore, the rotation angle θy associated with the yaw direction can be calculated taking advantage of equality between the ratio of px to px' and the ratio θy to θy'. Specifically, the rotation angle θy associated with the yaw direction can be calculated using equation (9) as follows.

$$θy=px×θy'/px' \quad (9)$$

When the length of the marker section 6 in the lateral direction is not considered, the limit angle θy' may be ½ of the angle of view of the controller 5, and the value of the px' may be "1".

Finally, the CPU 10 calculates, as the yaw orientation component M3y, the rotation matrix for performing rotation by the angle θy calculated using equation (9). Specifically, the yaw orientation component M3y is calculated in accordance with equation (10) as follows.

$$M3y = \begin{bmatrix} \cos\theta y & 0 & -\sin\theta y \\ 0 & 1 & 0 \\ \sin\theta y & 0 & \cos\theta y \end{bmatrix} \quad (10)$$

Data representing the matrix calculated in accordance with equation (10) is stored to the main memory as the yaw orientation component data 74. Following step S33, the process of step S34 is performed.

In step S34, the CPU 10 combines the roll orientation component M3r with the yaw orientation component M3y. That is, the roll orientation component data 73 and the yaw orientation component data 74 are read from the main memory, and multiplies the roll orientation component M3r represented by the data 73, by the yaw orientation component M3y represented by the data 74. Following step S34, the process of step S35 is performed.

In step S35, the CPU 10 calculates the pitch orientation component M3p based on the first orientation. It is possible to calculate the pitch orientation component M3p based on the y-coordinate value of the coordinate point (px,py) in the same manner as that used for the yaw orientation component M3y although the manner is not used in the present embodiment. However, the method for calculating the orientation in the yaw direction (the pitch direction) using the coordinate point (px,py) can be used when the input device 8 and the marker section 6 are positioned at the same lateral (vertical in the case of the pitch direction) position. In the game system 1 of the present embodiment, the player may operate the input device 8 almost straight in front of the marker section 6 (the television 2) in the lateral direction, and therefore it is possible to calculate the orientation in the yaw direction in the manner used in step S33 based on the assumption that "the input device 8 and the marker section 6 are positioned on the same lateral position". On the other hand, the player may stand or sit to operate the input device 8, and further the marker section 6 may be positioned above or below the screen of the television 2. Therefore, in the game system 1 of the present embodiment, it is not always assumed that "the input device 8 and the marker section 6 are positioned at the same vertical position", and therefore the orientation in the pitch direction may not necessarily be calculated using the coordinate point (px,py).

In the present embodiment, the first orientation is used as it is for the pitch orientation component M3p (therefore, in the second correction process, no correction is made for the pitch direction). Specifically, the CPU 10 reads the first orientation data 68 from the main memory. The rotation angle Gp associated with the pitch direction is calculated in accordance with equation (11) using components of the first orientation matrix M1 represented by the first orientation data 68.

$$\cos(\theta p) = (Zx \times Zx + Zz \times Zz)^{1/2}$$

$$\sin(\theta p) = Zy \quad (11)$$

Variables Zx, Zy, and Zz in equation (11) represent the components of the first orientation matrix M1 represented in equation (1). The first orientation matrix M1 used here is the first orientation matrix M1 obtained through the first correction process performed in the current process loop. Further, the CPU 10 calculates a matrix of the pitch orientation component M3p using cos(θp) and sin(θp) calculated in equation (11), in accordance with equation (12).

$$M3p = \begin{bmatrix} 1 & 0 & 0 \\ 0 & \cos\theta p & \sin\theta p \\ 0 & -\sin\theta p & \cos\theta p \end{bmatrix} \quad (12)$$

Data representing the matrix calculated by equation (15) is stored to the main memory as the pitch orientation component data 75. Following step S35, the process of step S36 is performed.

In step S36, the CPU 10 calculates the third orientation based on the orientation components of the roll direction, the yaw direction, and the pitch direction. The third orientation is obtained by further combining the pitch orientation component M3p with the combination result of the roll orientation component M3r and the yaw orientation component M3y. Specifically, the CPU 10 reads the pitch orientation component data 75 from the main memory, and multiplies the matrix calculated in step S34 by the pitch orientation component M3p represented by the pitch orientation component data 75. Data representing the calculated matrix is stored to the main memory as the third orientation data 76. Following step S36, the process of step S37 is performed.

In step S37, the CPU 10 corrects the first orientation using the third orientation. The correction of step S37 is made such that the first orientation matrix M1 approaches the third orientation matrix M3 at a predetermined rate (constant C2 described below). The CPU 10 reads the first orientation data 68 and the third orientation data 76 from the main memory. The correction is made using the first orientation matrix M1 represented by the first orientation data 68 and the third orientation matrix M3 represented by the third orientation data 76, in accordance with equation (13).

$$M1 = (M3 - M1') \times C2 + M1' \quad (13)$$

In equation (13), variable M1' represents an uncorrected first orientation matrix. Further, constant C2 is preset to a value in the range of 0<C2≤1, for example, 0.1. Data representing the corrected first orientation matrix M1 calculated in accordance with equation (13) is stored to the main memory as an update to the first orientation data 68. Following step S37, the CPU 10 ends the second correction process.

As described above, in the second correction process, the third orientation is calculated from the pickup image (the marker coordinate point), and the first orientation is corrected so as to approach the third orientation. Through this correction, the first orientation can be corrected so as to represent a more accurate value. Although in the present embodiment the third orientation only associated with the roll direction and the yaw direction is calculated from the pickup image, the third orientation associated with the pitch direction can be calculated from the pickup image as described above, and, in another embodiment, the third orientation associated with the roll direction, the yaw direction, and the pitch direction may be calculated from the pickup image. Further, in the second correction process, the third orientation associated with at least one of the roll direction, the yaw direction, and the pitch direction may be calculated.

Returning to the description of FIG. 14, in step S7, following step S6, the CPU 10 performs the game process using the corrected first orientation. This game process may be any process so long as the first orientation matrix M1 representing the corrected first orientation is reflected in game results as an input value. For example, in the process, an object in a virtual game space may be controlled and displayed such that the object has an orientation represented by the first orientation matrix M1, or such that the object is moved at a rate corresponding to an angle between a predetermined orientation and the orientation represented by the first orientation matrix M1. Following step S7, the process of step S8 is performed.

In step S8, the CPU 10 determines whether or not the game is to be ended. The determination of step S8 is performed based on, for example, whether or not the game has been cleared, whether or not the game is over, or whether or not the player has given an instruction to stop the game. When the determination result of step S8 is negative, the process of step S3 is performed again. Thereafter, the process loop of steps S3 to S8 is repeated until it is determined in step S8 that the game is to be ended. On the other hand, when the determination result of step S8 is affirmative, the CPU 10 ends the game process shown in FIG. 14. This is the end of the description of the game process.

As described above, in the present embodiment, the first orientation of the input device 8 is calculated based on the angular rates detected by the gyroscopes 55 and 56 (step S4), and the first orientation is corrected in the first correction process (S5) and the second correction process (S6). The game process is performed using the corrected first orientation (step S7), and therefore the CPU 10 is allowed to perform the game process based on an accurate orientation of the input device 8. Therefore, for example, the orientation of the input device 8 can be accurately reflected in the orientation of an object in a game space, thereby enhancing the operability of the game.

[Variants]

Although in the present embodiment the three-dimensional orientation is calculated using the gyroscopes for detecting angular rates around three axes, the present invention is also applicable to calculation of the orientation (rotation angle) in the two-dimensional plane as shown in FIGS. 8 to 12. The orientation in the two-dimensional plane may be calculated by detecting angular rates around two axes using a two-axis gyroscope, or by detecting an angular rate around a predetermined axis using a one-axis gyroscope.

Further, in another embodiment, the second correction process may be performed only when it is assumed that the input device 8 has taken an image of the marker section 6. Specifically, the CPU 10 determines whether or not the input device 8 (the image pickup means) is oriented to a direction in which an image of the marker section 6 can be taken, before the second correction process is performed. This determination can be performed using the first orientation or the second orientation. For example, it may be determined whether the imaging direction of the input device 8 in the first (or second) orientation is the same as or opposite to the direction from the input device 8 to the marker section 6. Further, the first orientation used for the determination may be the first orientation having been subjected to the first and the second correction processes in the immediately preceding process loop or may be the first orientation having been calculated and subjected to the first correction process in the current process loop.

When the CPU 10 determines that the input device 8 is oriented to the direction in which an image of the marker section 6 can be taken, the second correction process is performed, and when the CPU 10 determines that the input device 8 is not oriented to the direction in which an image of the marker section 6 can be taken, the second correction process is skipped. Some entity other than the marker section 6 (for example, electric light in a room, or sunlight outside a window) may be erroneously detected as the marker section 6, and when the third orientation is calculated using a marker coordinate point obtained through such erroneous detection, and the second correction process is performed using such a third orientation, the correction cannot be accurately made. On the other hand, when the determination process as described above is performed, it is possible to prevent the second correction process from being performed using the third orientation calculated from the marker coordinate point having been erroneously detected. Therefore, the second correction process can be performed with enhanced accuracy.

As described above, the present invention is intended to, for example, accurately calculate an orientation of an input device using a gyroscope, and can be used as, for example, a game apparatus or program in which the game process is performed in accordance with the orientation of the input device.

While the invention has been described in detail, the foregoing description is in all aspects illustrative and not restrictive. It is understood that numerous other modifications and variations can be devised without departing from the scope of the invention.

What is claimed is:

1. An orientation calculation apparatus for obtaining data from an input device including at least a gyroscope and an acceleration sensor, and calculating an orientation of the input device, the apparatus comprising:
    an orientation calculation unit for calculating a first orientation of the input device in accordance with an angular rate detected by the gyroscope; and
    a first correction unit for correcting the first orientation so as to approach a second orientation of the input device as the angular rate decreases, wherein the second orientation is an orientation in which a direction of an acceleration represented by acceleration data detected by the acceleration sensor is a vertically downward direction.

2. The orientation calculation apparatus according to claim 1, wherein,
    the input device further includes an image pickup unit, and
    the orientation calculation apparatus further comprises a second correction unit for correcting the first orientation in accordance with an image of a predetermined subject taken by the image pickup unit.

3. The orientation calculation apparatus according to claim 1, wherein the first correction unit further corrects the first orientation such that the closer a magnitude of the acceleration is to a magnitude of a gravitational acceleration, the more closely the first orientation approaches the second orientation.

4. The orientation calculation apparatus according to claim 1, wherein the first correction unit corrects the first orientation only when a difference between a magnitude of the acceleration and a magnitude of a gravitational acceleration is smaller than a predetermined reference value.

5. The orientation calculation apparatus according to claim 1, wherein the first correction further corrects the first orientation so as to approach the second orientation as an amount of change per unit time for the acceleration decreases.

6. A game apparatus for performing a game process using, as the orientation of the input device, the first orientation corrected by the orientation calculation apparatus according to claim 1.

7. The orientation calculation apparatus according to claim 1, wherein a degree at which the first orientation is corrected varies based on the detected angular rate.

8. An orientation calculation apparatus for obtaining data from an input device including at least a gyroscope and an acceleration sensor, and calculating an orientation of the input device, the apparatus comprising:
   an orientation calculation unit for calculating a first orientation of the input device in accordance with an angular rate detected by the gyroscope; and
   a first correction means unit for correcting the first orientation so as to approach a second orientation of the input device as an amount of change per unit time for an acceleration decreases, wherein the second orientation is an orientation in which a direction of the acceleration is a vertically downward direction, and the acceleration is represented by acceleration data detected by the acceleration sensor.

9. The orientation calculation apparatus according to claim 8, wherein,
   the input device further includes an image pickup unit, and
   the orientation calculation apparatus further comprises a second correction unit for correcting the first orientation in accordance with an image of a predetermined subject taken by the image pickup unit.

10. The orientation calculation apparatus according to claim 8, wherein the first correction unit further corrects the first orientation such that the closer a magnitude of the acceleration is to a magnitude of a gravitational acceleration, the more closely the first orientation approaches the second orientation.

11. The orientation calculation apparatus according to claim 8, wherein the first correction unit corrects the first orientation only when a difference between a magnitude of the acceleration and a magnitude of a gravitational acceleration is smaller than a predetermined reference value.

12. A game apparatus for performing a game process using, as the orientation of the input device, the first orientation corrected by the orientation calculation apparatus according to claim 8.

13. A non-transitory computer-readable storage medium having stored therein an orientation calculation program to be executed by a computer of an orientation calculation apparatus for obtaining data from an input device including at least a gyroscope and an acceleration sensor, and calculating an orientation of the input device, the program causing the computer to execute instructions comprising:
   calculating a first orientation of the input device in accordance with an angular rate detected by the gyroscope; and
   correcting the first orientation so as to approach a second orientation of the input device as the angular rate decreases, wherein the second orientation is an orientation in which a direction of an acceleration represented by acceleration data detected by the acceleration sensor is a vertically downward direction.

14. The non-transitory storage medium according to claim 13, wherein,
   the input device further includes an image pickup unit, and
   the orientation calculation program further causes the computer to execute instructions comprising correcting the first orientation in accordance with an image of a predetermined subject taken by the image pickup unit.

15. The non-transitory storage medium according to claim 13, wherein the first orientation is corrected such that the closer a magnitude of the acceleration is to a magnitude of a gravitational acceleration, the more closely the first orientation approaches the second orientation.

16. The non-transitory storage medium according to claim 13, wherein the first orientation is corrected only when a difference between a magnitude of the acceleration and a magnitude of a gravitational acceleration is smaller than a predetermined reference value.

17. The non-transitory storage medium according to claim 13, wherein the first orientation is further corrected so as to approach the second orientation as an amount of change per unit time for the acceleration decreases.

18. A non-transitory storage medium having stored therein a game program for performing a game process using, as the orientation of the input device, the first orientation corrected by the orientation calculation program according to claim 13.

19. A non-transitory computer-readable storage medium having stored therein an orientation calculation program to be executed by a computer of an orientation calculation apparatus for obtaining data from an input device including at least a gyroscope and an acceleration sensor, and calculating an orientation of the input device, the program causing the computer to execute instructions comprising:
   calculating a first orientation of the input device in accordance with an angular rate detected by the gyroscope; and
   correcting the first orientation so as to approach a second orientation of the input device as an amount of change per unit time for an acceleration decreases, wherein the second orientation is an orientation in which a direction of the acceleration is a vertically downward direction, and the acceleration is represented by acceleration data detected by the acceleration sensor.

20. The non-transitory storage medium according to claim 19, wherein,
   the input device further includes an image pickup unit, and
   the orientation calculation program further causes the computer to execute instructions comprising correcting the first orientation in accordance with an image of a predetermined subject taken by the image pickup unit.

21. The non-transitory storage medium according to claim 19, wherein the first orientation is corrected such that the closer a magnitude of the acceleration is to a magnitude of a gravitational acceleration, the more closely the first orientation approaches the second orientation.

22. The non-transitory storage medium according to claim 19, wherein the first orientation is corrected only when a difference between a magnitude of the acceleration and a magnitude of a gravitational acceleration is smaller than a predetermined reference value.

23. A non-transitory storage medium having stored therein a game program for performing a game process using, as the orientation of the input device, the first orientation corrected by the orientation calculation program according to claim 19.

24. A method implemented in an information processing apparatus having one or more processors and for obtaining data from an input device including at least a gyroscope and an acceleration sensor, and calculating an orientation of the input device, the method comprising:
   calculating, via the one or more processors, a first orientation of the input device in accordance with an angular rate detected by the gyroscope; and
   correcting the first orientation so as to approach a second orientation of the input device as the angular rate decreases, wherein the second orientation is an orientation in which a direction of an acceleration represented by acceleration data detected by the acceleration sensor is a vertically downward direction.

25. An orientation calculation system, comprising:
an input device including at least a gyroscope and an acceleration sensor; and
an orientation calculation apparatus for obtaining data from the input device and calculating an orientation of the input device, the apparatus comprising:
- an orientation calculation unit for calculating a first orientation of the input device in accordance with an angular rate detected by the gyroscope; and
- a first correction unit for correcting the first orientation so as to approach a second orientation of the input device as the angular rate decreases, wherein the second orientation is an orientation in which a direction of an acceleration represented by acceleration data detected by the acceleration sensor is a vertically downward direction.

* * * * *